US010838192B2

(12) United States Patent
Ozcan et al.

(10) Patent No.: US 10,838,192 B2
(45) Date of Patent: Nov. 17, 2020

(54) METHOD AND DEVICE FOR HIGH-RESOLUTION COLOR IMAGING USING MERGED IMAGES FROM HOLOGRAPHIC AND LENS-BASED DEVICES

(71) Applicant: THE REGENTS OF THE UNIVERSITY OF CALIFORNIA, Oakland, CA (US)

(72) Inventors: Aydogan Ozcan, Los Angeles, CA (US); Yibo Zhang, Los Angeles, CA (US); Yichen Wu, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 214 days.

(21) Appl. No.: 16/300,539

(22) PCT Filed: May 9, 2017

(86) PCT No.: PCT/US2017/031813
§ 371 (c)(1),
(2) Date: Nov. 9, 2018

(87) PCT Pub. No.: WO2017/196885
PCT Pub. Date: Nov. 16, 2017

(65) Prior Publication Data
US 2020/0310100 A1    Oct. 1, 2020

Related U.S. Application Data

(60) Provisional application No. 62/334,286, filed on May 10, 2016.

(51) Int. Cl.
*G06T 5/50* (2006.01)
*G02B 21/36* (2006.01)
(Continued)

(52) U.S. Cl.
CPC ....... *G02B 21/367* (2013.01); *G02B 21/0008* (2013.01); *G03H 1/0443* (2013.01);
(Continued)

(58) Field of Classification Search
None
See application file for complete search history.

(56) References Cited

U.S. PATENT DOCUMENTS 3,917,379 A    11/1975 Noguchi
8,842,901 B2    9/2014 Ozcan et al.
(Continued)

OTHER PUBLICATIONS

PCT International Preliminary Report on Patentability (Chapter I of the Patent Cooperation Treaty) for PCT/US2017/031813, Applicant: The Regents of the University of California, Form PCT/IB/326 and 373, dated Nov. 22, 2018 (9pages).
(Continued)

*Primary Examiner* — Eileen M Adams
(74) *Attorney, Agent, or Firm* — Vista IP Law Group LLP

(57) ABSTRACT

Methods and systems for generating a high-color-fidelity and high-resolution color image of a sample are disclosed; which fuses or merges a holographic image acquired at a single wavelength with a color-calibrated image taken by a low-magnification lens-based microscope using a wavelet transform based colorization method. A holographic microscope is used to obtain holographic images which are used to computationally reconstruct a high-resolution mono-color holographic image of the sample. A lens-based microscope is used to obtain low resolution color images. A discrete wavelet transform (DWT) is used to generate a final image that merges the low-resolution components from the lens-based color image and the high-resolution components from the high-resolution mono-color holographic image.

24 Claims, 11 Drawing Sheets

(51) Int. Cl.
G03H 1/04 (2006.01)
G02B 21/00 (2006.01)
G03H 1/08 (2006.01)
G03H 1/00 (2006.01)

(52) U.S. Cl.
CPC .......... *G03H 1/0866* (2013.01); *G06T 5/50* (2013.01); *G03H 2001/005* (2013.01); *G03H 2210/13* (2013.01); *G06T 2207/20064* (2013.01); *G06T 2207/20221* (2013.01)

(56) References Cited

U.S. PATENT DOCUMENTS

| | | | |
|---|---|---|---|
| 8,866,063 | B2 | 10/2014 | Ozcan et al. |
| 8,874,403 | B2 | 10/2014 | Ozcan et al. |
| 8,916,390 | B2 | 12/2014 | Ozcan et al. |
| 9,007,433 | B2 | 4/2015 | Ozcan et al. |
| 9,057,702 | B2 | 6/2015 | Ozcan et al. |
| 9,170,599 | B2 | 10/2015 | Ozcan et al. |
| 9,202,835 | B2 | 12/2015 | Ozcan |
| 9,331,113 | B2 | 5/2016 | Ozcan et al. |
| 9,588,037 | B2 | 3/2017 | Ozcan et al. |
| 9,605,941 | B2 | 3/2017 | Ozcan et al. |
| 9,683,938 | B2 | 6/2017 | Ozcan et al. |
| 9,715,099 | B2 | 7/2017 | Ozcan et al. |
| 9,767,341 | B2 | 9/2017 | Ozcan et al. |
| 10,088,663 | B2 | 10/2018 | Ozcan et al. |
| 2007/0206852 | A1* | 9/2007 | McGee .......... H04N 19/85 382/166 |
| 2011/0149110 | A1* | 6/2011 | Sugiyama .......... H04N 19/436 348/223.1 |
| 2012/0148141 | A1 | 6/2012 | Ozcan et al. |
| 2012/0157160 | A1 | 6/2012 | Ozcan et al. |
| 2012/0218379 | A1* | 8/2012 | Ozcan .......... G03H 1/0866 348/40 |
| 2012/0248292 | A1 | 10/2012 | Ozcan et al. |
| 2013/0092821 | A1 | 4/2013 | Ozcan et al. |
| 2013/0157351 | A1 | 6/2013 | Ozcan et al. |
| 2013/0193544 | A1 | 8/2013 | Ozcan et al. |
| 2013/0203043 | A1 | 8/2013 | Ozcan et al. |
| 2013/0258091 | A1 | 10/2013 | Ozcan et al. |
| 2013/0280752 | A1 | 10/2013 | Ozcan et al. |
| 2014/0120563 | A1 | 5/2014 | Ozcan et al. |
| 2014/0160236 | A1 | 6/2014 | Ozcan et al. |
| 2014/0300696 | A1 | 10/2014 | Ozcan et al. |
| 2015/0111201 | A1 | 4/2015 | Ozcan et al. |
| 2015/0153558 | A1 | 6/2015 | Ozcan et al. |
| 2015/0204773 | A1 | 7/2015 | Ozcan et al. |
| 2016/0070092 | A1 | 3/2016 | Ozcan et al. |
| 2016/0161409 | A1 | 6/2016 | Ozcan et al. |
| 2016/0327473 | A1 | 11/2016 | Ozcan et al. |
| 2016/0334614 | A1 | 11/2016 | Ozcan et al. |
| 2017/0153106 | A1 | 6/2017 | Ozcan et al. |
| 2017/0160197 | A1 | 6/2017 | Ozcan et al. |
| 2017/0168285 | A1 | 6/2017 | Ozcan et al. |
| 2017/0220000 | A1 | 8/2017 | Ozcan et al. |
| 2017/0357083 | A1 | 12/2017 | Ozcan et al. |

OTHER PUBLICATIONS

Hardie et al., Joint MAP Registration and High-Resolution Image Estimation Using a Sequence of Undersampled Images, IEEE, vol. 6 No. 12, Dec. 1997.
Ozcan et al., Ultra wide-filed lens-free monitoring of cells on-chip, Lab on Chip 8, 89-106, Nov. 1, 2007.
Ozcan et al., Lens-free On-Chip Cytometry Rfor wireless Health Diagnosis, IEEE LEOS Newsletter, Oct. 2008.
Seo et al., Lensfree On-chip Cytometry Using Tunable Monochromatic Illumination and Digital Noise Reduction, Multi-color LUCAS, Sep. 2008.
Seo et al., Lensfree holographic imaging for on-chip cytometry and diagnostics, Lab on a Chip, 9, 777-787, Dec. 6, 2008.
Su et al., Towards Wireless Health: Lensless On-Chip Cytometry, Biophotonics, Dec. 2008.
Su et al., High-Throughput Lensfree Imaging and Characterization of Heterogeneous Cell Solution On a Chip, Biotechnology and Bioengineering, Sep. 8, 2008.
Isikman et al., Lensfree Cell Holography On a Chip: From Holographic Cell Signatures to Microscopic Reconstruction, LEOS Annual Meeting Conf. Proceedings, Oct. 2009.
Mudanyali et al., Lensless On-chip Imaging of Cells Provides a New Tool for High-throughput Cell-Biology and Medical Diagostics, Journal of Visualized Experiments, Dec. 14, 2009.
Bishara et al., Lensfree on-chip microscopy over a wide field-of-view using pixel super-resolution, Optics Express, vol. 18 No. 11, May 24, 2010.
Coskun et al., Wide field-of-view lens-free fluorescent imaging on a chip, Lab Chip, 10(7), 824-827, Apr. 7, 2010.
Coskun et al., Lensless wide-field fluorescent imaging on a chip using compressive decoding of sparse objects, Optics Express, vol. 18 No. 10, May 5, 2010.
Khademhosseinieh et al., Lensfree color imaging on a nanostructured chip using compressive decoding, Applied Physics Letters, 97, 211112-1, Nov. 24, 2010.
Khademhosseinieh et al., Lensfree on-chip imaging using nanostructured surfaces, Applied Physics Letters, 96, 171106, Apr. 30, 2010.
Mudanyali et al., Compact, light-weight and cost-effective microscope based on lensless incoherent holography for telemedicine applications, Lab Chip, 10, 1417-1428, Apr. 19, 2010.
Ozcan, Smart technology for global access to healthcare, SPIE, Mar. 16, 2010.
Ozcan et al., Lensfree on-chip holography facilitates novel microscopy applications, SPIE, May 19, 2010.
Bishara et al., Holographic pixel super-resolution in portable lensless on-chip microscopy using a fiber-optic array, Lab on a Chip, 11, 1276-1279, Mar. 1, 2011.
Lee et al., Field-portable reflection and transmission microscopy based on lensless holography, Biomedical Optics Express, vol. 2, No. 9, Aug. 30, 2011.
J. L. Pech-Pacheco et al., "Diatom Autofocusing in Brightfield Microscopy: a Comparative Study," in Pattern Recognition, International Conference On (IEEE Computer Society, 2000), vol. 3, p. 3318 (2000).
Oh et al., On-chip differential interference contrast microscopy using lensless digital holography, Optics Express, vol. 18, No. 5, 4717-4726 (2010).
L. J. Allen and M. P. Oxley, Optics Communications, 199, 65-75 (2001).
Greenbaum et al., Wide-field computational color imaging using pixel super-resolved on chip microscopy, Optics Express, vol. 21, No. 10, 12469-483 (2013).
Greenbaum et al., Maskless imaging of dense samples using pixel super-resolution based multi-height lensfree on-chip microscopy, Optics Express, vol. 20, No. 3, 3129-3143 (2012).
Greenbaum et al., Field-Portable Pixel Super-Resolution Colour Microscope, PLos One 8(9): e76475 (2013).
Greenbaum et al., Increased space-bandwidth product in pixel super-resolved lensfree on-chip microscopy, Scientific Reports, 3: 1717 (2013).
Greenbaum et al., Imaging without lenses: achievements and remaining challenges of wide-field on-chip microscopy, Nat Methods. 9(9) (2012).
Göröcs, Z., Kiss, M., Tóth, V., Orzó, L. & Tökés, S. Multicolor digital holographic microscope (DHM) for biological purposes. in BiOS 75681P-75681P (International Society for Optics and Photonics, 2010).
Ramanath, R., Snyder, W. E., Bilbro, G. L. & Sander, W. A. Demosaicking methods for Bayer color arrays. J. Electron. Imaging 11, 306-315 (2002).
PCT International Search Report for PCT/US2017/031813, Applicant: The Regents of the University of California, Form PCT/ISA/210 and 220, dated Aug. 4, 2017 (3pages).
PCT Written Opinion of the International Search Authority for PCT/US2017/031813, Applicant: The Regents of the University of California, Form PCT/ISA/237, dated Aug. 4, 2017 (7pages).

(56) References Cited

OTHER PUBLICATIONS

Dardano, P et al., Three-dimensional imaging using digital holography and scanning electron microscopy. Institute for Microelectronics and Microsystems (IMM)-CNR, Via Pietro Castellino No. 111, 80131, Napoli, Italy, Jun. 26, 2014 [retrieved on Jul. 18, 2017], http://ieeeplore.ieee.org/document/6843975.

Zhang, Y. et al., Color calibration and fusion of lens-free and mobile-phone microscopy images for high-resolution and accurate color reproduction. Scientific Reports, 6:27811, DOI: 10.1038/srep27811. Jun. 10, 2016 [retrived on Jul. 18, 2017], https://www.nature.com/articles/srep27811.

Greenbaum et al., Wide-field computational imaging of pathology slides using lens-free on chip microscopy, www.ScienceTranslationalMedicine.org, Dec. 17, 2014, vol. 6, Issue 267, 267ra175 (23pages).

* cited by examiner

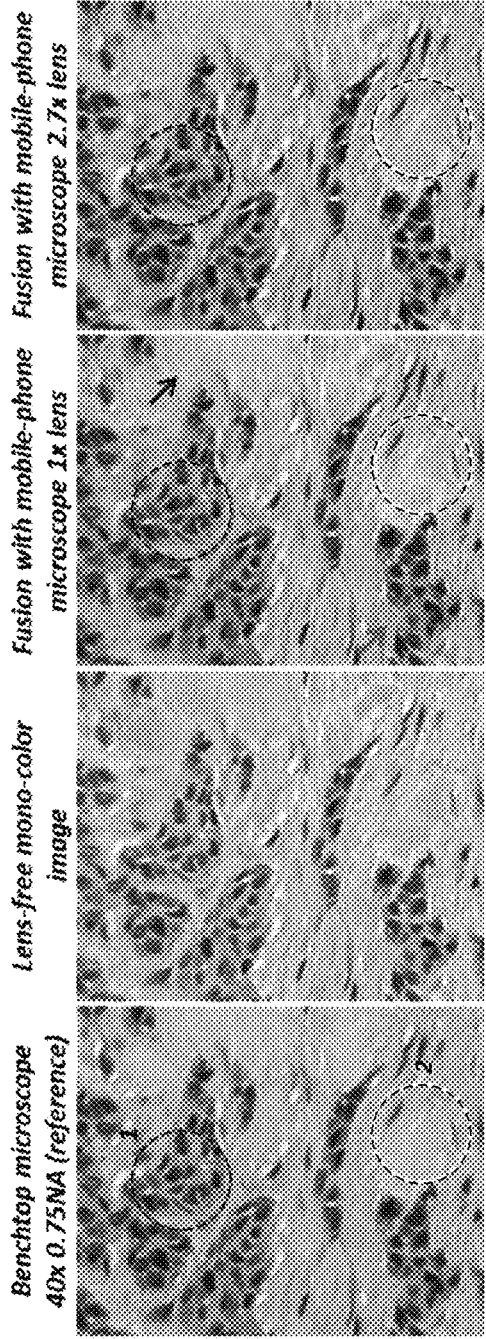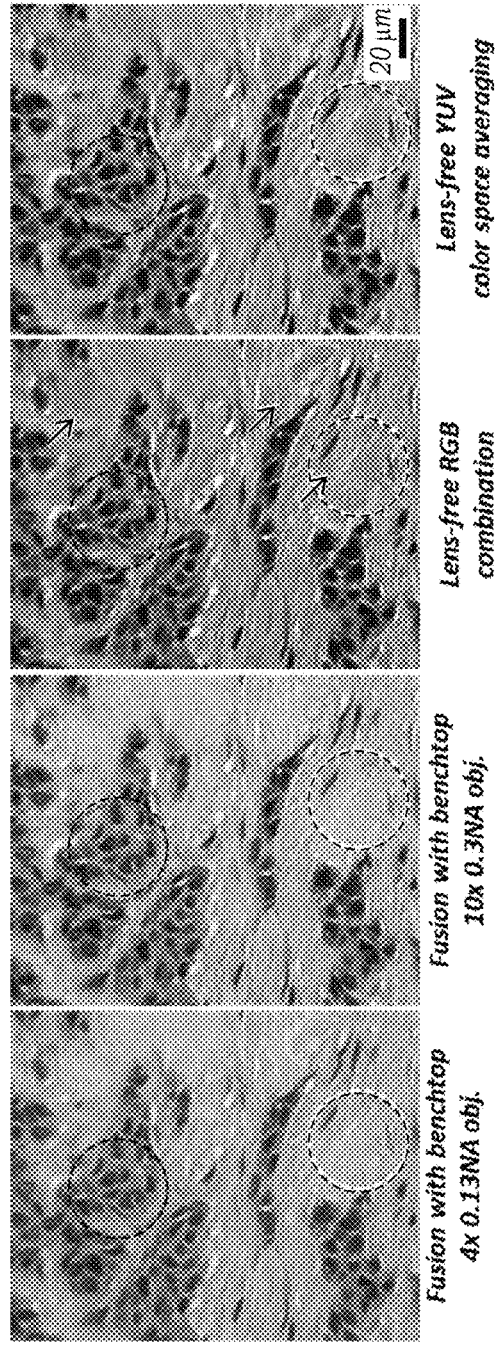
FIG. 8(a) Benchtop microscope 40x 0.75NA (reference)
FIG. 8(b) Lens-free mono-color image
FIG. 8(c) Fusion with mobile-phone microscope 1x lens
FIG. 8(d) Fusion with mobile-phone microscope 2.7x lens
FIG. 8(e) Fusion with benchtop 4x 0.13NA obj.
FIG. 8(f) Fusion with benchtop 10x 0.3NA obj.
FIG. 8(g) Lens-free RGB combination
FIG. 8(h) Lens-free YUV color space averaging

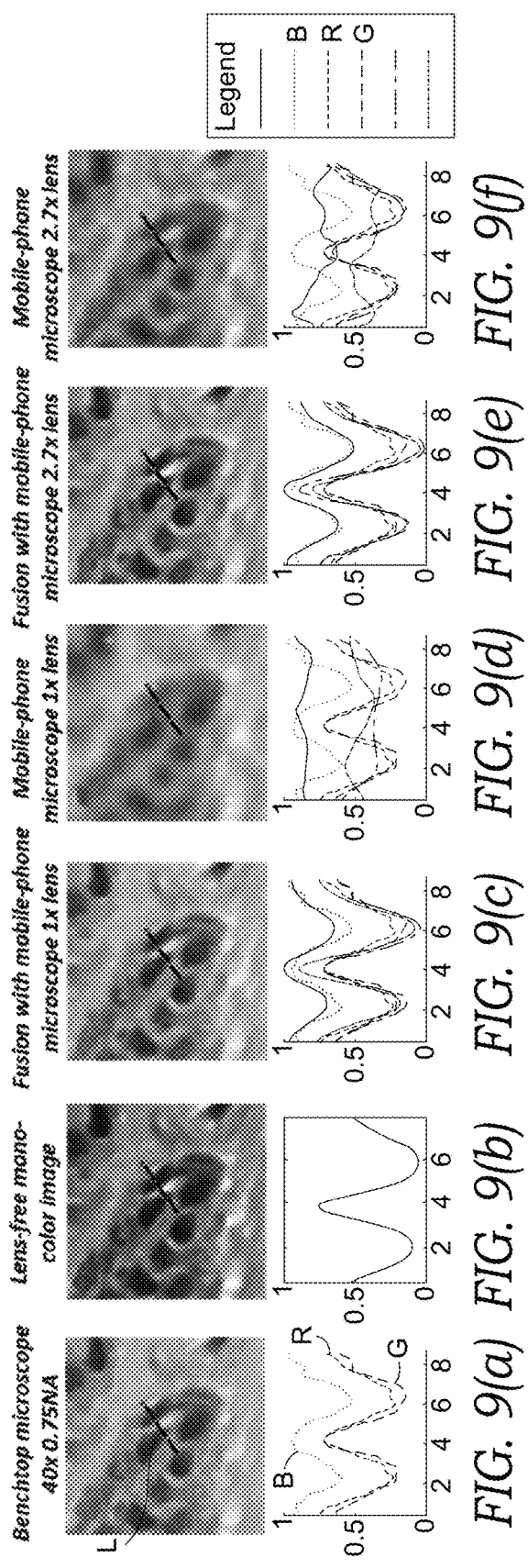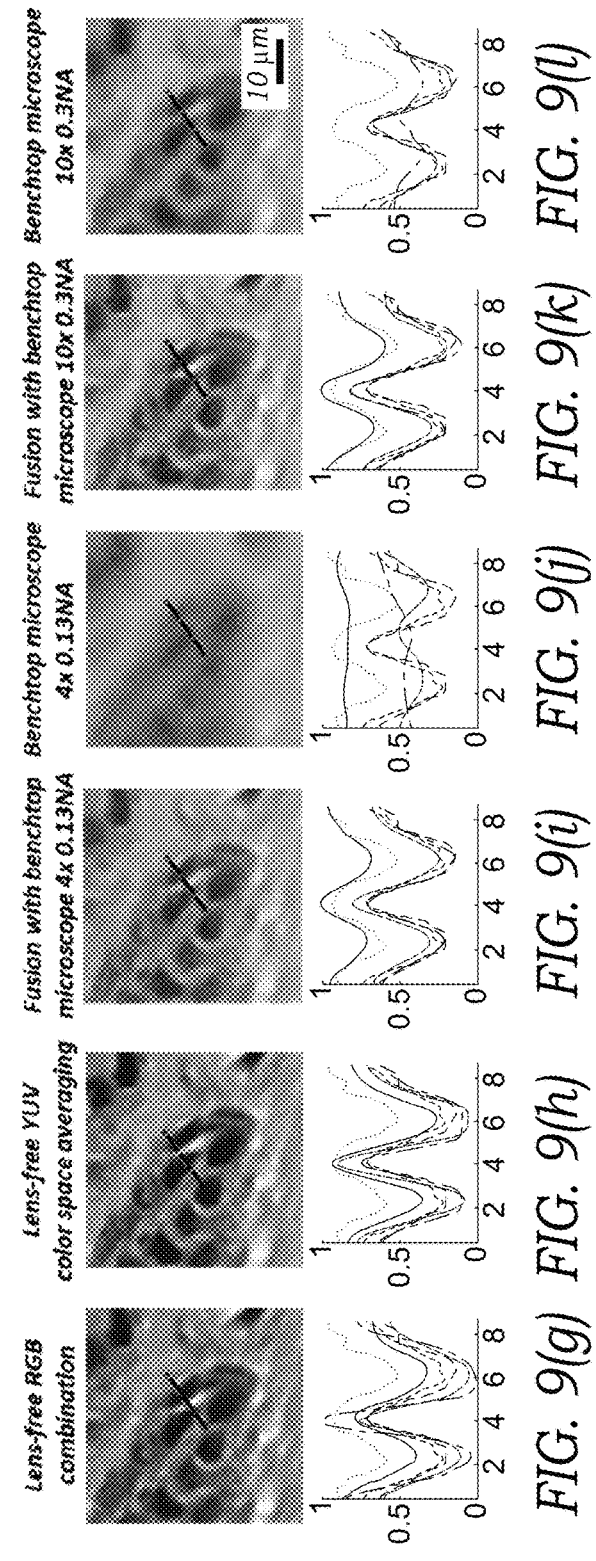
FIG. 9(a) FIG. 9(b) FIG. 9(c) FIG. 9(d) FIG. 9(e) FIG. 9(f)
FIG. 9(g) FIG. 9(h) FIG. 9(i) FIG. 9(j) FIG. 9(k) FIG. 9(l)

METHOD AND DEVICE FOR HIGH-RESOLUTION COLOR IMAGING USING MERGED IMAGES FROM HOLOGRAPHIC AND LENS-BASED DEVICES

RELATED APPLICATION

This Application is a U.S. National Stage filing under 35 U.S.C. § 371 of International Application No. PCT/US2017/031813, filed May 9, 2017, which claims priority to U.S. Provisional Patent Application No. 62/334,286 filed on May 10, 2016, which are hereby incorporated by reference. Priority is claimed pursuant to 35 U.S.C. §§ 119, 371 and any other applicable statute.

TECHNICAL FIELD

The technical field generally relates methods and devices for obtaining colored, microscopic images by merging or fusing of holographic microscope images acquired at a single wavelength with a color-calibrated image taken by a low magnification lens-based microscope.

BACKGROUND

Lens-free on-chip microscopy that is based on digital in-line holography has emerged as a promising technique for point-of-care imaging and pathology applications, with the advantages of significantly larger field-of-view (FOV) as compared to conventional lens-based microscopy tools. Lens-free microscope devices are also light weight, compact, and field portability. However, the holographic imaging principles that underlie lens-free, on-chip microscopy inherently limits the illumination to narrow-band illumination sources. Thus, to obtain a color image, reconstructions at multiple wavelengths are usually needed. For example, some of the previously used lens-free RGB colorization methods combine image reconstructions at three discrete wavelengths selected from the red, green and blue regions of the visible spectrum. Unfortunately, these RGB-combination methods are subject to color distortions since the chromatic response of human vision has rather broad responsivity curves (i.e., color matching functions). Therefore, a simple combination of holographic images recorded at red, green and blue illumination wavelengths, with relatively narrow peaks, is not a good representation of the chromatic response of human vision.

In contrast to color images obtained using RGB-combination methods, conventional, lens-based incoherent bright-field microscopy has a natural advantage in color reproduction since a broadband or "white" light source is typically used for illumination, and the spectral sensitivity curves of the color filter arrays (CFA) employed in digital image sensor chips (CMOS or CCD) are designed to approximate the color matching functions of the human visual system. Furthermore, a variety of color calibration methods exist to further improve the color fidelity of bright-field microscopy systems. While traditional, lens-based incoherent bright-field microscopes score well when looking at chromatic response, these microscopes often require high magnification lenses or lens sets that make the same expensive and bulky. Furthermore, these lens-based devices have significantly smaller FOVs as compared to the lens-free counterparts.

SUMMARY

Methods and systems are described that bridge the advantages of lens-free microscopy with those of lens-based microscopes to achieve high color accuracy, high resolution, as well as wide FOV at the same time. In one embodiment, the method uses a lens-free holographic computational microscope that uses a single wavelength of illumination (i.e., mono-color) in combination with a low-magnification, lens-based incoherent microscope to generate color corrected wide-field and high-resolution images of specimen. The lens-based microscope may include a conventional bright-field microscope or it may include a mobile phone based microscope that uses an attachment or the like as described herein. In one particular embodiment, the lens-free microscope may include a benchtop or desktop device. In another embodiment, the lens-free microscope may include an attachment or the like that is used in conjunction with the color imaging sensor of a portable electronic device such as a mobile phone, tablet, webcam to obtain lens-free images that are used in the computational process to generate high resolution, mono-color images of the sample. For example, pixel super-resolution (PSR) techniques can be applied to break the resolution limit imposed by the pixel size of the image sensor or chip. This is accomplished, for example, by imparting relative movement in the x and y directions in a plane that substantially parallel to the active area of the image sensor or chip. Likewise, multi-height based phase recovery techniques (using images obtained at different heights in the z direction) can be used to remove twin-image related artifacts that may be present, particularly when the sample is dense and connected such as tissue sections using in pathology applications.

A separate lens-based attachment can be attached to the portable electronic device to obtain the color images. The lens-based attachment may have a low power magnification lens; making the attachment cost-effective and also relatively small. For optimal color performance, lens-based microscope images are optionally digitally color-calibrated using, for example, a polynomial regression based calibration framework and denoised. The mono-color or grayscale holographic image of the lens-free microscope and the lens-based bright-field color image are then merged using a discrete wavelet transform-based algorithm as explained herein to generate the final color image of the specimen, where the high-resolution components (i.e., the spatial details) come from the lens-free image and the low-resolution components come from the lens-based color image. Because the lens-based imaging system employs low-magnification and low-NA, its FOV can be matched to the FOV of the lens-free microscope by digitally tiling together multiple lens-based images.

The accuracy of this digital image fusion approach is demonstrated by imaging stained breast cancer tissue sections which shows that a lens-free holographic microscope in combination with a portable and inexpensive mobile-phone-based microscope can generate color images of specimen that are very close to the images acquired by a color-corrected high-NA benchtop microscopy system. This digital colorization method can be very useful for wide-field imaging needs related to point-of-care and telepathology applications, especially in resource-scarce settings.

In one embodiment, a method of generating color images of a sample using mono-color holographic images of the sample obtained from a holographic microscope (e.g., a lens-free microscope in one specific embodiment) and one or more color images of the same sample using a lens-based microscope. In the method, a plurality of low resolution mono-color holographic images of the sample are obtained using the holographic microscope at different spatial locations. A reconstructed high resolution mono-color holographic image of the sample is generated using the plurality of low resolution mono-color holographic images (e.g., using pixel super-resolution). One or more low resolution color images of the sample are obtained with the lens-based microscope (e.g., using a benchtop device or portable electronic device). A red (R) channel, a green (G) channel, and a blue (B) channel are extracted from the one or more low resolution color images of the sample to generate a R channel extracted image, a G channel extracted image, and a B channel extracted image. The R channel extracted image, the G channel extracted image, and the B channel extracted image are registered with the high resolution mono-color holographic image based on spatial features contained in the high resolution mono-color holographic image. The contrast of the high resolution mono-color holographic image is matched to the R channel extracted image, the G channel extracted image, and the B channel extracted image.

A discrete wavelet transform (DWT) is applied to the contrast matched high resolution mono-color holographic image and the R channel extracted image, the G channel extracted image, and the B channel extracted image to decompose the images using wavelet decomposition. Next, respective red, green, and blue fused images are formed using the low resolution components (or approximate wavelet coefficients) from the R channel extracted image, the G channel extracted image, and the B channel extracted image and high resolution components (or detailed wavelet coefficients) from the high resolution mono-color holographic image. An inverse wavelet transform is applied onto the respective red, green, and blue fused images to generate a high resolution red image, a high resolution green image, and a high resolution blue. A composite RGB color image can then be generated from the high resolution red image, the high resolution green image, and the high resolution blue image.

In another embodiment, a system for generating color images of a sample using mono-color holographic images of the sample obtained from a holographic microscope and one or more color images of the same sample using a lens-based microscope. The system includes a computing device configured to receive the mono-color holographic images of the sample obtained from a holographic microscope and the one or more color images of the same sample using a lens-based microscope, the computing device containing one or more processors configured to execute imaging software thereon. The imaging software is configured to receive a plurality of low resolution mono-color holographic images of the sample using the holographic microscope at different spatial locations; generate a reconstructed high resolution mono-color holographic image of the sample using the plurality of low resolution mono-color holographic images; receive one or more low resolution color images of the sample with the lens-based microscope; extract a red (R) channel, a green (G) channel, and a blue (B) channel from the one or more low resolution color images of the sample and generating a R channel extracted image, a G channel extracted image, and a B channel extracted image; register the R channel extracted image, the G channel extracted image, and the B channel extracted image with the high resolution mono-color holographic image based on spatial features contained in the high resolution mono-color holographic image; match the contrast of the high resolution mono-color holographic image to the R channel extracted image, the G channel extracted image, and the B channel extracted image; apply a discrete wavelet transform (DWT) to the contrast matched high resolution mono-color holographic image and the R channel extracted image, the G channel extracted image, and the B channel extracted image; generate respective red, green, and blue fused images using low resolution components from the R channel extracted image, the G channel extracted image, and the B channel extracted image and high resolution components from the high resolution mono-color holographic image; apply an inverse wavelet transform onto the respective red, green, and blue fused images to generate a high resolution red, a high resolution green image, and a high resolution blue image; and generate a composite RGB color image from the high resolution red image, the high resolution green image, and the high resolution blue image.

In yet another embodiment, a system for generating color images of a sample includes a holographic microscope having a partially coherent light source configured to illuminate the sample and cast mono-color holograms that are captured by an image sensor disposed adjacent to the sample, wherein the holographic microscope comprises an x, y adjuster for imparting relative movement in a plane substantially parallel to an active surface of the image sensor in the x direction and y direction and a z adjuster for imparting relative movement in a z direction that is substantially perpendicular to a plane of the active surface of the image sensor; a lens-based microscope having a broadband light source configured to illuminate the sample and at least one lens or lens set disposed along an optical path and an image sensor configured to capture color images of the sample; and one or more processors configured to execute imaging processing software thereon. The image processing software extracting red (R), green (G), and blue (B) images from the captured colored images and registering the extracted red (R), green (G), and blue (B) images with a reconstructed high resolution mono-color holographic image of the sample generated by a plurality of low resolution mono-color holographic images, imaging software further applying discrete wavelet transformation to the registered high resolution mono-color holographic image and the extracted red (R) image, the extracted green (G) image, and the extracted blue (B) image and generating respective red, green, and blue fused images using low resolution components from the extracted red (R) image, the extracted green (G) image, and the extracted blue (B) image and high resolution components from the high resolution mono-color holographic image; applying an inverse wavelet transform onto the respective red, green, and blue fused images to generate a high resolution red image, a high resolution green image, and a high resolution blue image; and generate a composite RGB color image from the high resolution red image, the high resolution green image, and the high resolution blue image.

BRIEF DESCRIPTION OF THE DRAWINGS

FIG. 8(a) illustrates an image of H&E stained breast cancer tissue sections obtained using a 40×0.75 NA benchtop microscope image after color calibration. This is used as the reference image to evaluate the color performance and resolution of other techniques.

FIG. 8(b) is a lens-free mono-color intensity image of the same region of the sample that is used in the image fusion process.

FIG. 8(c) illustrates the final fused image of the same region of the sample obtained using the mobile phone based microscope with a 1× lens.

FIG. 8(d) illustrates the final fused image of the same region of the sample obtained using the mobile phone based microscope with a 2.7× lens.

FIG. 8(e) illustrates the final fused image of the same region of the sample obtained using a benchtop microscope using a 4×0.13 NA objective lens.

FIG. 8(f) illustrates the final fused image of the same region of the sample obtained using a benchtop microscope using a 10×0.3 NA objective lens.

FIG. 8(g) illustrates, for comparison purposes, an image of the same region of the sample using lens-free RGB combination.

FIG. 8(h) illustrates, for comparison purposes, an image of the same region of the sample using lens-free YUV color space averaging.

FIG. 9(a) illustrates a zoomed in region of H&E stained breast cancer tissue section obtained with a color calibrated benchtop microscope using a 40×0.75 NA objective lens. This is used as the reference image. Also illustrated in the image is a line L that passes through two closely located nuclei. Below the image is a plot of the line profile for the R, G, and B color channels for line L.

FIG. 9(b) illustrates the lens-free mono-color image of the same zoomed in region of FIG. 9(a) that was obtained with a lens-free microscope. The line profile of the same line L appears as a single, solid line.

FIG. 9(c) illustrates the final fusion image obtained of the same zoomed region of FIG. 9(a) that was obtained with the mobile phone microscope with 1× lens. Below the image is a plot of the line profile for the R, G, and B color channels for line L that was obtained and overlaid against the line profile obtained from the reference image of FIG. 9(a).

FIG. 9(d) illustrates the mobile phone image (non-fused) obtained of the same zoomed region of FIG. 9(a) that was obtained with the mobile phone microscope with 1× lens. Below the image is a plot of the line profile for the R, G, and B color channels for line L that was obtained and overlaid against the line profile obtained from the reference image of FIG. 9(a).

FIG. 9(e) illustrates the final fusion image obtained of the same zoomed region of FIG. 9(a) that was obtained with the mobile phone microscope with 2.7× lens. Below the image is a plot of the line profile for the R, G, and B color channels for line L that was obtained and overlaid against the line profile obtained from the reference image of FIG. 9(a).

FIG. 9(f) illustrates the mobile phone image (non-fused) obtained of the same zoomed region of FIG. 9(a) that was obtained with the mobile phone microscope with 2.7× lens. Below the image is a plot of the line profile for the R, G, and B color channels for line L that was obtained and overlaid against the line profile obtained from the reference image of FIG. 9(a).

FIG. 9(g) illustrates, for comparison purposes, an image obtained of the same zoomed region of FIG. 9(a) using lens-free RGB combination. Below the image is a plot of the line profile for the R, G, and B color channels for line L that was obtained and overlaid against the line profile obtained from the reference image of FIG. 9(a).

FIG. 9(h) illustrates, for comparison purposes, an image obtained of the same zoomed region of FIG. 9(a) using lens-free YUV color space averaging. Below the image is a plot of the line profile for the R, G, and B color channels for line L that was obtained and overlaid against the line profile obtained from the reference image of FIG. 9(a).

FIG. 9(i) illustrates the final fusion image obtained of the same zoomed region of FIG. 9(a) that was obtained with a benchtop microscope using a 4×0.13 NA objective lens. Below the image is a plot of the line profile for the R, G, and B color channels for line L that was obtained and overlaid against the line profile obtained from the reference image of FIG. 9(a).

FIG. 9(j) illustrates the benchtop microscope image (non-fused) obtained of the same zoomed region of FIG. 9(a) that was obtained with 4×0.13 NA objective lens. Below the image is a plot of the line profile for the R, G, and B color channels for line L that was obtained and overlaid against the line profile obtained from the reference image of FIG. 9(a).

FIG. 9(k) illustrates the final fusion image obtained of the same zoomed region of FIG. 9(a) that was obtained with a benchtop microscope using a 10×0.3 NA objective lens. Below the image is a plot of the line profile for the R, G, and B color channels for line L that was obtained and overlaid against the line profile obtained from the reference image of FIG. 9(a).

FIG. 9(l) illustrates the benchtop microscope image (non-fused) obtained of the same zoomed region of FIG. 9(a) that was obtained with 10×0.3 NA objective lens. Below the image is a plot of the line profile for the R, G, and B color channels for line L that was obtained and overlaid against the line profile obtained from the reference image of FIG. 9(a).

DETAILED DESCRIPTION OF THE ILLUSTRATED EMBODIMENTS

Figure 1:
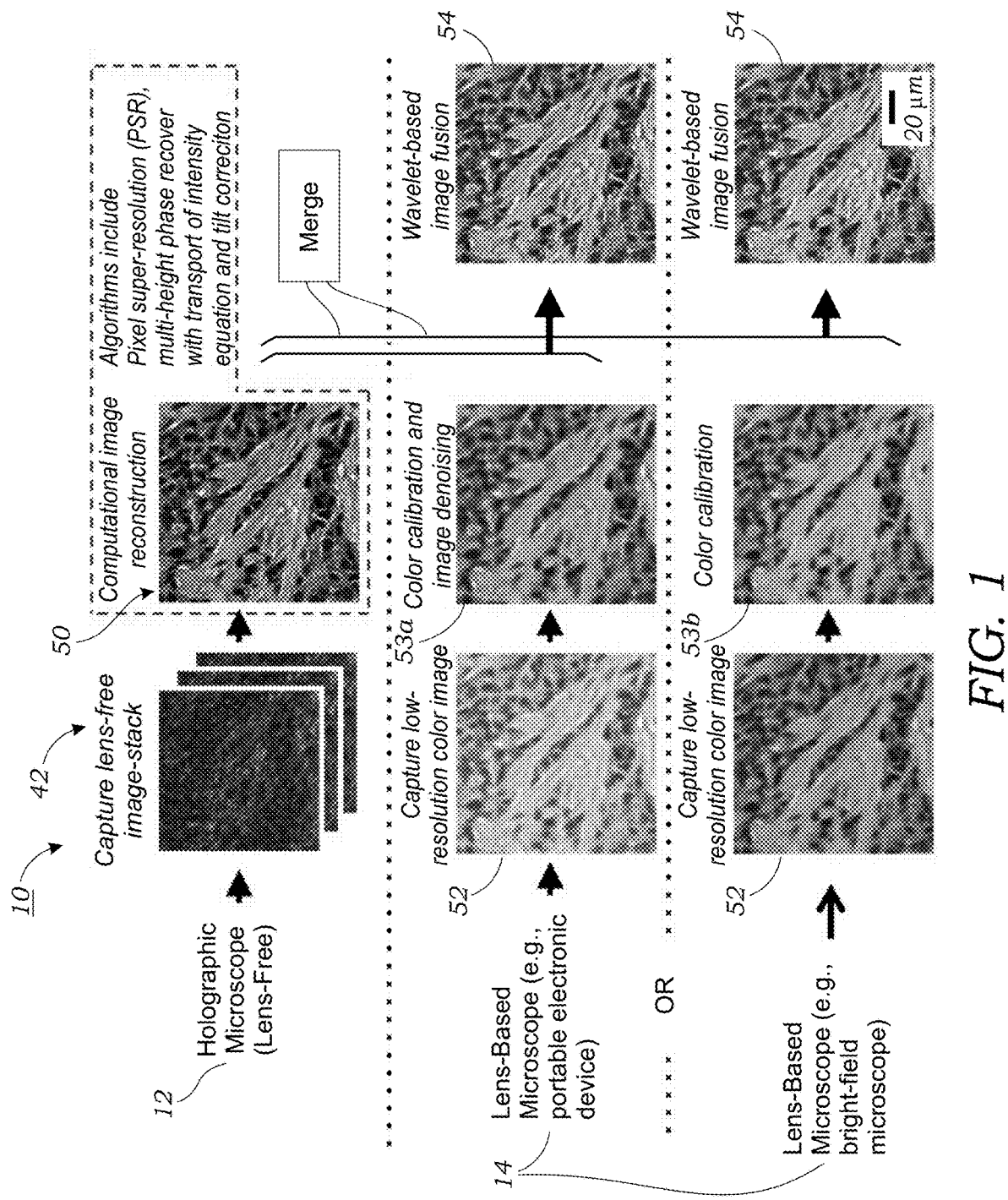
FIG. 1 illustrates a schematic representation of the method of creating high color accuracy, high resolution color images using images obtained from a lens-free microscope as well as a lens-based microscope.
Figure 2A:
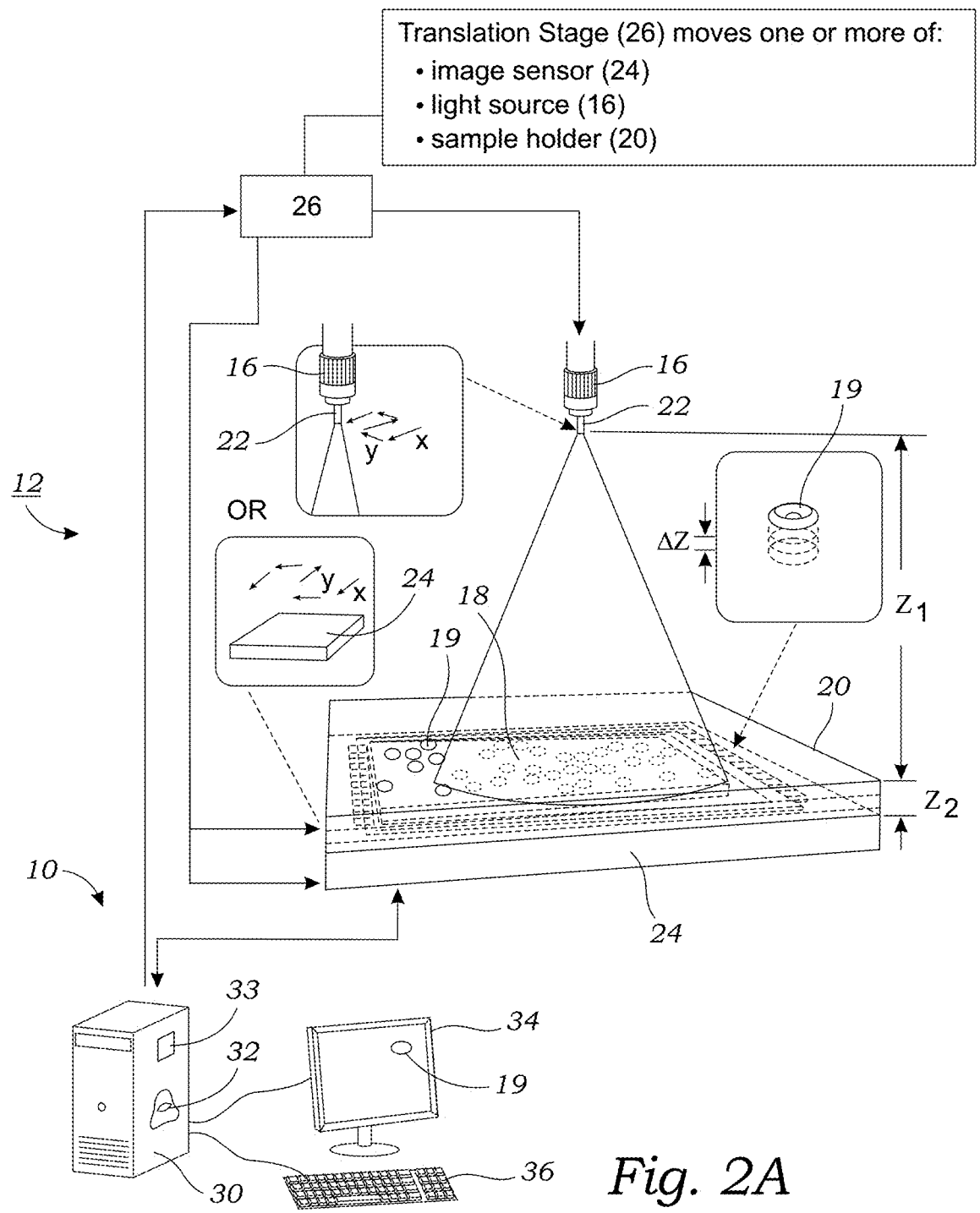
FIG. 2A illustrates one embodiment of a lens-free microscope that is used to capture a plurality of lens-free images that are computationally reconstructed (e.g., pixel super-resolution) to generate a reconstructed high resolution mono-color holographic image of the sample.
Figure 2B:
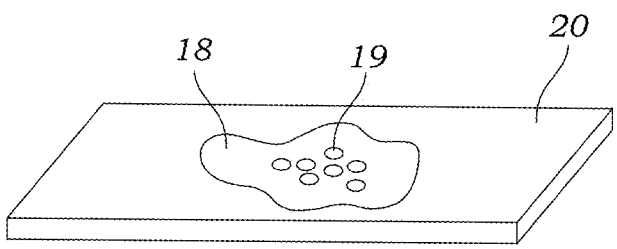
FIG. 2B illustrates a sample holder or substrate that contains a sample disposed thereon. The sample holder may be formed from an optically transparent substrate (e.g., glass or plastic).
Figure 4A:
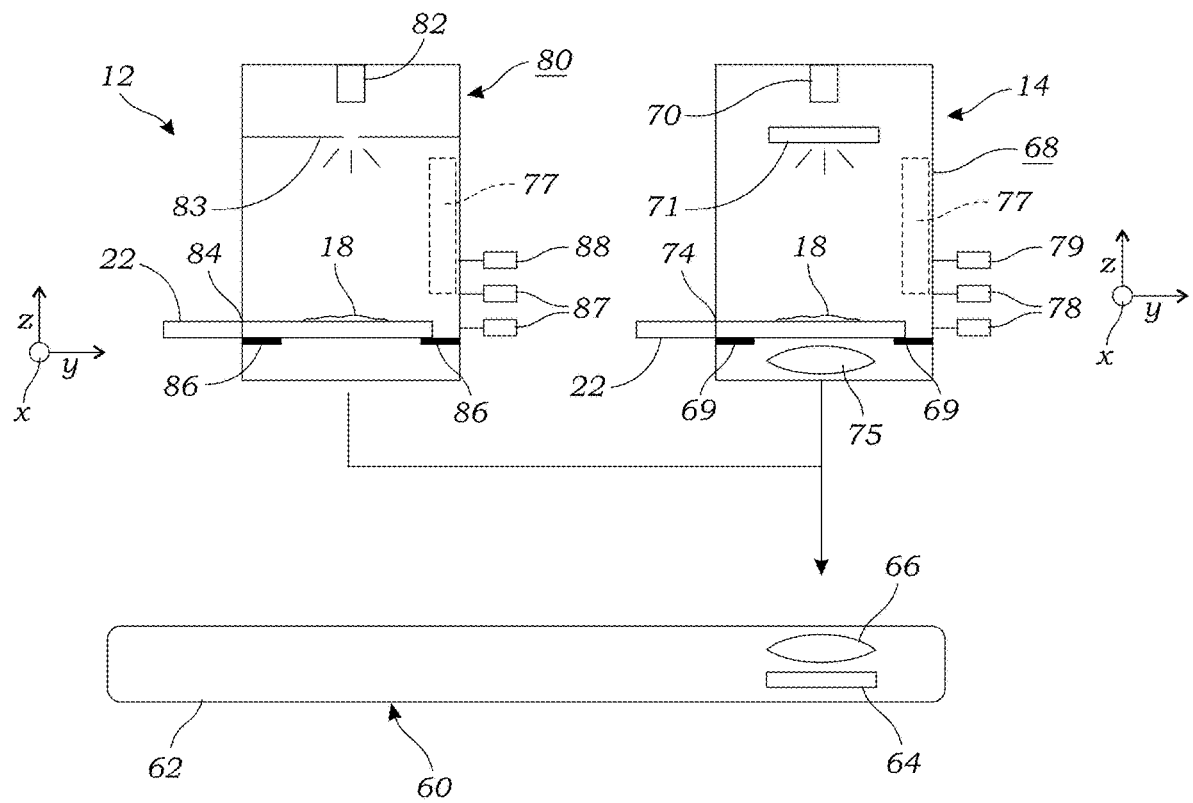
FIG. 4A illustrates one embodiment of a portable electronic device with camera functionality (e.g., mobile phone) that is used to acquire both lens-free and lens-based images of a sample. The embodiment includes a first lens-free attachment that may be secured to the mobile phone to obtain lens-free images of the sample. A second lens-based attachment may also be secured to the mobile phone to obtain lens-based images of the sample. The first and second attachments may be swapped and used as needed to acquire the lens-free or lens-based images.

FIG. 1 illustrates a top-level view of the operations of a system 10 for creating high color accuracy, high resolution, as well as wide FOV images using merged images from a holographic microscope device 12 and a lens-based microscope device 14. With reference to FIGS. 1, 2A, 2B, and 4A, in one embodiment the holographic microscope device 12 includes a lens-free holographic microscope device 12 that may include a benchtop or desktop device such as that illustrated in FIG. 2A or it may be incorporated into a lens-free microscope attachment 14 as illustrated in FIG. 4A. With reference to FIG. 2A, the benchtop holographic microscope device 12 includes a partially coherent light source 16 that is used to provide the narrow band or mono-color illumination of a sample 18 that is disposed on a sample holder 20 as seen in FIG. 2B. The sample 18 may include, for example, a tissue sample such as a thinly sliced tissue preparation that is commonly used in histological and pathology applications.

The partially coherent light source 16 may include, in some embodiments, a broadband light source that is filtered with an acousto-optic filter that outputs partially coherent light within a narrow bandwidth (e.g., 2.5 nm). The light can be coupled to a single-mode optical fiber 22 that illuminates the sample located on the sample holder 20. The sample holder 20 is an optically transparent substrate such as glass or plastic that is used to hold a sample. For example, the sample holder 20 may include a glass pathology slide. The holographic microscope device 12 includes an image sensor 24 (e.g., CMOS or CCD) that is located adjacent to the underside of the sample holder 20. The distance between the output of the partially coherent light source 16 (e.g., end of optical fiber 22) and the sample 18 referred to as the $z_1$ distance is generally on the order of several centimeters (e.g., ~5-15 cm). The active surface (i.e., imaging surface) of the image sensor 24 is located a distance $z_2$ below the sample 18 and is much smaller as compared to the $z_1$ distance (i.e., $z_2 \ll z_1$). The typical distance for the $z_2$ dimension is generally less than 1 mm and, in other embodiments, between about 100 µm to about 600 µm. The image sensor 24 in the holographic microscope device 12 is used to capture holographic images of objects 19 and features contained in the sample 18. In one specific embodiment, the holographic microscope device 12 is a lens-free holographic microscope device 12 that lacks any lenses or lens sets, modules, or the like. Objects 19 may include sub-cellular features such as organelles or the like (e.g., nuclei) that are present in the sample 18.

With reference to FIG. 2A, the holographic microscope device 12 further includes, in one embodiment, a translation stage 26 that is coupled to the image sensor 24 that moves the image sensor 24 in the x or y directions which lie in a plane that is substantially parallel with the active surface of the image sensor 24 or in the z direction which, as illustrated, is generally orthogonal to the plane of the active surface of the image sensor 24. Movement in the x or y directions is used to generate high resolution, mono-color images of the sample using pixel super-resolution. In order to generate super-resolved images, a plurality of different lower resolution images are taken as image sensor 24 is moved in small increments in the x and y directions. In another alternative embodiment, the optical fiber 22 is moved in small increments generally in the x and y directions by the translation stage 26. In yet another alternative, the sample holder 20 may be moved in small increments in the x and y directions. The translation stage 26 may be automatically controlled using a computer 30, dedicated controller, or the like to control an actuating element. Any number of mechanical actuators may be used including, for example, a stepper motor, moveable stage, piezoelectric element, or solenoid. The translation stage 26 may also be manually-operated stage. Preferably, the translation stage 26 can move in sub-micron increments thereby permitting images to be taken of the sample 18 at slight x and y displacements. In still an alternative embodiment, rather than move the optical fiber 22 in the x and y directions, a plurality of spaced apart illumination sources (not shown) can be selectively actuated to achieve the same result without having to physically move the optical fiber 22 or image sensor 24. The small discrete shifts (either by movement or actuation of spatially separated light sources 16) parallel to the image sensor 24 are used to generate a single, high resolution image (e.g., pixel super-resolution). In addition to movement in the x and y directions, the translation stage 26 may also move the sample holder 20 and/or image sensor 24 in the z direction so that images may be obtain at multiple heights. This enables multi-height phase recovery as described in more detail below.

Figure 3A:
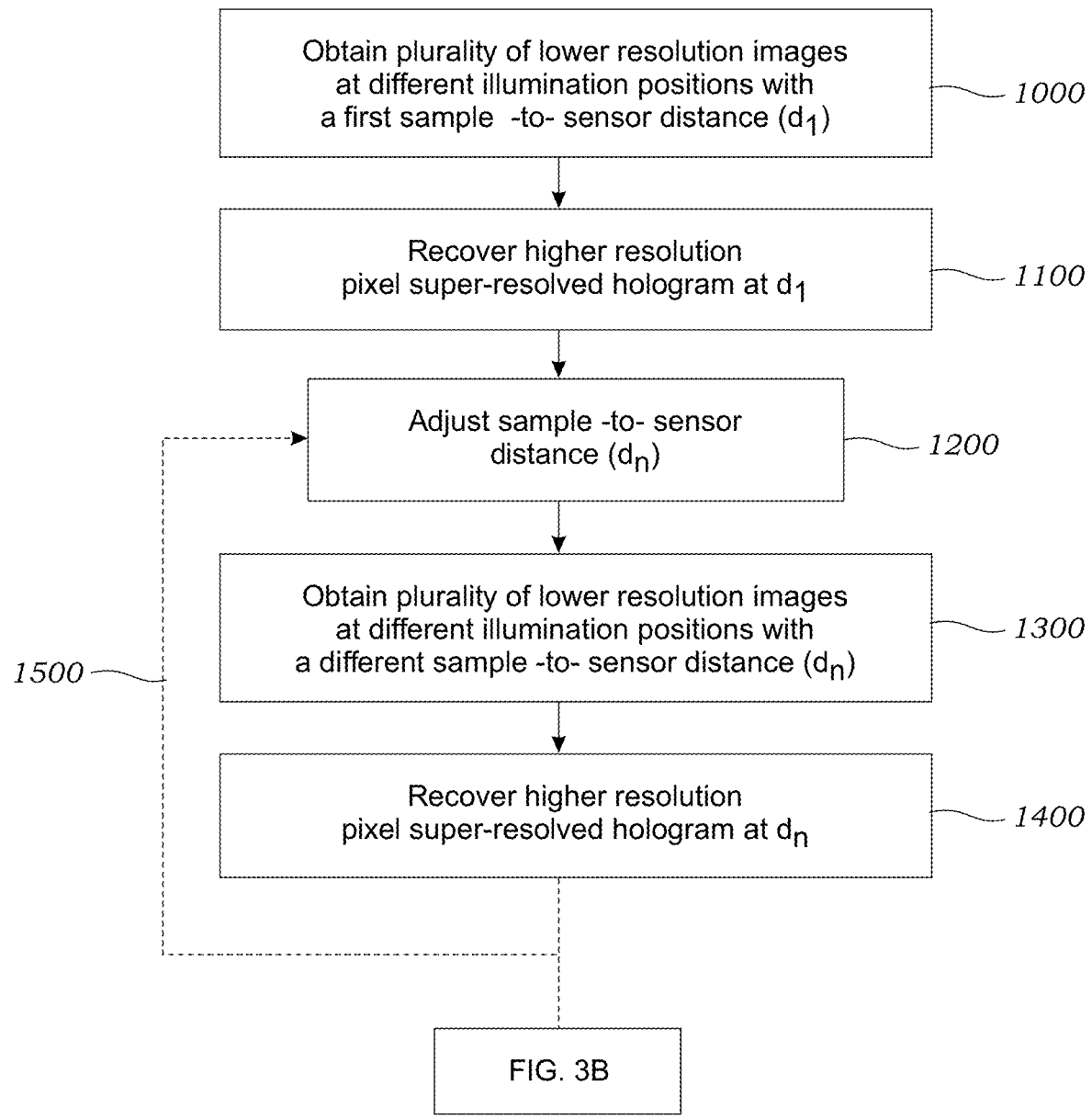
FIGS. 3A and 3B illustrate a method used to reconstruct phase and amplitude images of a sample according to one embodiment.

In the pixel super-resolution process, a plurality of lower resolution images are taken at different positions and are used to generate a computational image reconstruction that has high resolution. As seen in FIG. 3A, in step 1000, a plurality of lower resolution images are obtained of the sample 18 while the illumination source 16, sample holder 20, and/or the image sensor 24 are moved relative to another at a plurality of different locations (e.g., x, y locations) to create the sub-pixel image shifts. The number of lower resolution images may vary but generally includes between about 2 and 250 images. During step 1000, the sample 18 is located from the image sensor 24 at a first distance ($d_1$). Next, as seen in step 1100, a pixel super-resolved (PSR) hologram is synthesized based upon the plurality of lower resolution images obtained in operation 1000. The details of digitally converting a plurality of lower resolution images into a single, higher resolution pixel SR image may be found in Bishara et al., Lensfree on-chip microscopy over a wide field-of-view using pixel super-resolution, *Optics Express* 18:11181-11191 (2010), which is incorporated herein by reference. This pixel super-resolution step takes lower resolution holographic shadows of the object(s) 19 contained within the sample 18 (e.g., captured at ~10 million pixels each) and then creates a higher resolution lens-free hologram that now contains >300 million pixels over the same 30 mm² field-of-view with an effective pixel size of ~300 nm.

Next, as seen in operation 1200, the distance between the sample 18 and the image sensor 24 is adjusted to a different distance ($d_n$) (e.g., by adjusting z distance using translation stage 26). At this new distance ($d_n$), as seen in operation 1300, a plurality of lower resolution images are obtained of the sample 18 containing the object(s) 19 while the illumination source 16, sample holder, and/or the image sensor 24 are moved relative to another at a plurality of different locations (e.g., x, y locations) to create the sub-pixel image shifts. The plurality of lower resolution images are obtained while the sample 18 and the image sensor 24 are located at the new or different distance ($d_n$). After the lower resolution images are obtained, as seen in operation 1400, a pixel super-resolved hologram (at the different distance ($d_n$)) is synthesized based upon the plurality of lower resolution images obtained in operation 1300. As seen by arrow 1500, process is repeated for different sample-to-sensor differences. Generally, the process repeats such that a pixel super-resolved hologram is created at between 2-20 different distances although this number may vary.

Figure 3B:
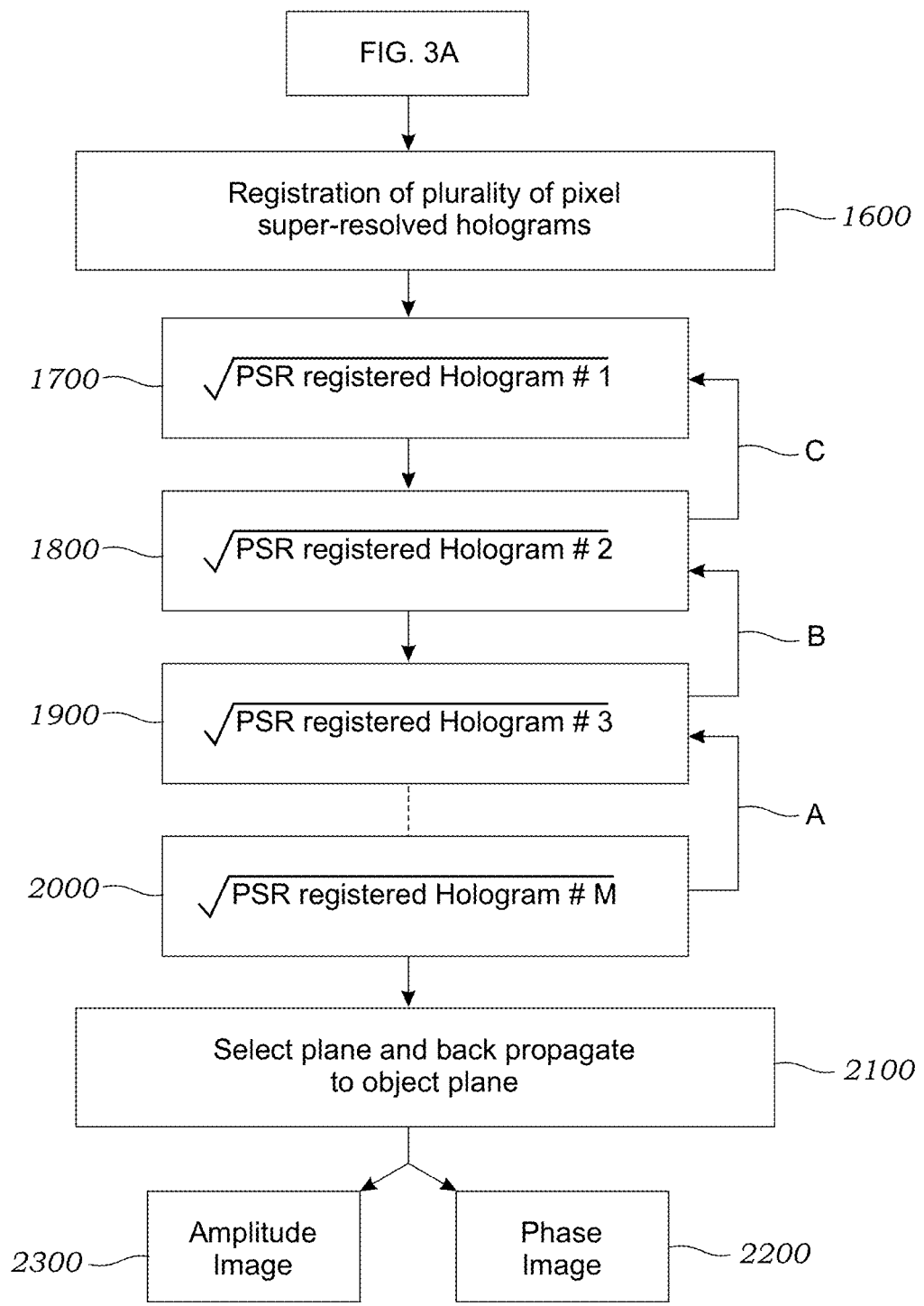

Now referring to FIG. 3B, the plurality of pixel super-resolved holograms obtained at the different heights (i.e., different z distances) are then registered with respect to each other as seen in operation 1600. The subsequent iterative phase recovery requires that these pixel super-resolved holograms are accurately registered to each other. During the image acquisition step, lateral translation and rotation of the objects between holograms of different heights are unavoidable. To accurately register these pixel super-resolved holograms to each other, three-control points from three different corners of the image are selected in one of the holograms (which is deemed the reference hologram). One preferred control point could be a small isolated dust particle at a corner since its hologram is circularly symmetric. If need be, a special alignment marker(s) can also be placed at the corners of the sample holder/substrate. Therefore, normalized correlations between lens-free holograms can be used to find the matching points in each image captured at a different height. After selection of the control points, a small area (e.g., ~30×30 µm) around each control point is cropped and digitally interpolated (~4-6 times) to serve as a normalized correlation template. Furthermore, for accurately finding the coordinate shift of each control point among M images, lens-free holographic images have to be positioned in the same $z_2$-distance. Therefore, the difference in the $z_2$-distance between lens-free holograms acquired at different heights is evaluated by an auto-focus algorithm, such as that disclosed in J. L. Pech-Pacheco et al., "Diatom Autofocusing in Brightfield Microscopy: a Comparative Study," in *Pattern Recognition, International Conference On* (IEEE Computer Society, 2000), Vol. 3, p. 3318, incorporated herein by reference, which permits one to digitally propagate the selected correlation templates to the same $z_2$-distance, where normalized correlations are calculated to find the coordinate shifts between the control points in each image. An affine transformation is used to register the super-resolved holograms of different heights to the reference hologram.

Still referring to FIG. 3B, operations 1700, 1800, 1900, and 2000 illustrate one embodiment of the iterative phase recovery process that is used to recover the lost optical phase. Additional details regarding the iterative phase recovery process may be found in L. J. Allen and M. P. Oxley, *Optics Communications*, 2001, 199, 65-75, which is incorporated herein by reference. The square roots of these resulting M registered holograms are then used as amplitude constraints in the iterative phase recovery algorithm that is steps 1700 through 2000. At the beginning of the algorithm, as seen in operation 1700, in one embodiment, the initial phase is assumed to be zero, after which the iterative phase recovery algorithm uses the free space propagation function to digitally propagate back and forth among these multiple heights. At each height, the amplitude constraint (i.e., the measurement) is enforced while the phase is kept from the previous digital propagation step.

To initiate the phase recovery process, a zero-phase is assigned to the object intensity measurement. One iteration during this phase-recovery process can be described as follows: Intensity measurement #1 (step 1700) is forward propagated (with zero initial phase) to the plane of intensity measurement #2 (step 1800). Then, the amplitude constraint in measurement #2 (step 1800) is enforced while the calculated phase resulting from forward propagation remains unchanged. The resulting complex field is then forward propagated to the plane of intensity measurement #3 (step 1900), where once again the amplitude constraint in measurement #3 is enforced while the calculated phase resulting from forward propagation remains unchanged. This process continues until reaching the plane of intensity measurement # M (step 2000). Then instead of forward propagating the fields of the previous stages, back propagation is used as seen by respective arrows A, B, and C. The complex field of plane # M (step 2000) is back propagated to the plane of intensity measurement # M−1. Then, the amplitude constraint in measurement # M−1 is enforced while the resulting phase remains unchanged. The same iteration continues until one reaches the plane of intensity measurement #1 (step 1700). When one complete iteration is achieved (by reaching back to the plane of intensity measurement #1), the complex field that is derived in the last step will serve as the input to the next iteration. Typically, between 1-1,000 iterations and more typically between 1-70 iterations are required for satisfactory results. After the phase recovery iterations are complete, as seen in operation 2100, the acquired complex field of any one of the measurement planes is selected and is back propagated to the object plane to retrieve both phase image 2200 and amplitude image 2300 of the sample 18.

As explained further herein, multi-height phase recovery may be incorporated by utilizing the solution to the transport of intensity equation (TIE) to obtain the initial guess of the lost phase as well as tilt correction. Details regarding the use of TIE to generate the initial phase guess to multi-height based iterative phase retrieval as well as tilt correction may be found in U.S. application Ser. No. 15/500,880, which is incorporated by reference herein.

Referring back to FIG. 2A, the system 10 includes a computer 30 such as a server, laptop, desktop, tablet computer, portable communication device (e.g., Smartphone), personal digital assistant (PDA) or the like that is operatively connected to the system 10 such that lower resolution images (e.g., lower resolution or raw image frames) are transferred from the image sensor 24 to the computer 30 for data acquisition and image processing. The computer 30 includes one or more processors 32 that, as described herein in more detail, runs or executes image processing software 33 that takes multiple, sub-pixel (low resolution) images taken at different scan positions (e.g., x and y positions as seen in inset of FIG. 1A) and creates a single, high resolution projection hologram image of the objects 19. The software 33 creates additional high resolution projection hologram images of the objects 19 at each different $z_2$ distance. The multiple, high resolution images obtained at different heights are registered with respect to one another using the software 33. The software 33 also digitally reconstructs complex projection images of the objects 19 through an iterative phase recovery process that rapidly merges all the captured holographic information to recover lost optical phase of each lens-free hologram without the need for any spatial masking, filtering, or prior assumptions regarding the samples. After a number of iterations (typically between 1 and 75), the phase of each lens-free hologram (captured at different heights) is recovered and one the pixel super-resolved holograms is back propagated to the object plane to create phase and amplitude images of the sample 18 including objects 19 contained therein.

The computer 30 may be associated with or contain a display 34 or the like that can be used to display color images that are generated in accordance with the methods described herein. The user may, for example, interface with the computer 30 via an input device 36 such as a keyboard or mouse to select different software functions using a graphical user interface (GUI) or the like. It should be noted that the method described herein may also be executed in a cloud-based processing operations. Image data could be sent to a remote computer 30 (e.g., remote server) for processing with a final image being generated remotely and sent back to the user on a separate computer 30 or other electronic device (e.g., mobile phone display) for ultimate display and viewing. Image and other data may be transferred over a wide area network such as the Internet or a proprietary communication network (like those used for mobile devices).

With reference back to FIG. 1, the holographic microscope 12 obtains a series of low resolution images 42 (e.g., image stack) that are used, as explained herein, to generate a high resolution mono-color holographic image 50 was obtained by computational image reconstruction using pixel super-resolution (PSR) along with multi-height phase recovery. According to the system 10 and methods described herein, this high resolution mono-color holographic image 50 is used in combination with a low resolution color image 52 that is obtained using a lens-based microscope device 14. As seen in FIG. 1, in one embodiment, the lens-based microscope device 14 may include a traditional bright-field microscope. In yet another alternative embodiment, the lens-based microscope device 14 may include a portable electronic, lens-based microscope device 14 (e.g., microscope that uses a mobile phone (e.g., Smartphone)). While the description herein is largely described as the portable electronic device being a mobile phone 60, it should be understood that other portable electronic devices such as tablets, webcams, and the like could also be used to capture images. As seen in FIG. 1, for a lens-based microscope 14 that is formed using a portable electronic device such as a mobile phone 60, the low-resolution color image is subject to color calibration and image denoising to generate corrected image 53*a*. For a lens-based microscope 14 that is formed using a conventional bright-field microscope device 14 (e.g., standard or conventional lens-based microscope), the low-resolution color image is subject to color calibration to generate corrected image 53*b*. The corrected images 53*a* or 53*b* are then combined or merged with the computationally reconstructed image 53 to generate wavelet-based fused images 54.

Figure 4B:
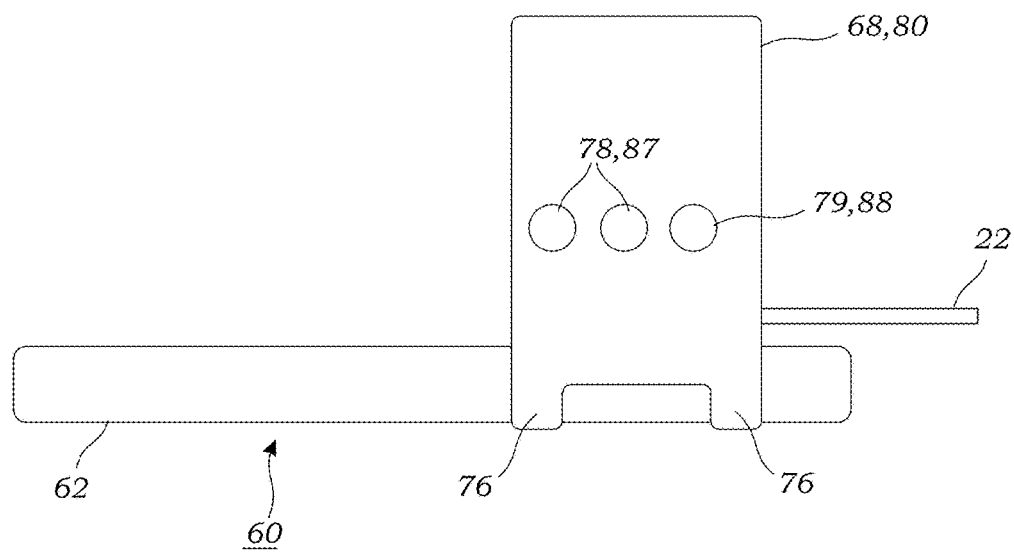
FIG. 4B illustrates a lens-free/lens-based attachment that is secured to the mobile phone. A sample loaded on a sample holder is inserted into the attachment and imaged using the camera functionality of the mobile phone.

With reference to FIGS. 4A and 4B, the portable electronic lens-based microscope device 14 in one embodiment is formed using a mobile phone 60 such as a Smartphone. The mobile phone 60 includes housing 62 that contains a color image sensor 64 that is used to provide camera functionality for the mobile phone 60. The mobile phone 60 further includes an internal lens 66 that is disposed within the housing 62 of the mobile phone 60. Any number of makes and models of the mobile phone 60 may be used with the system 10 and methods described herein. In one particular preferred embodiment, a lens-based modular attachment 68 is provided that is used to acquire low-resolution color images 52. In one embodiment, the lens-based modular attachment 68 contains a light source 70, which may be a white-colored LED or laser diode (or multiple light sources) as well as a diffuser 71 that is used to diffuse the light emanating from the light source 70. The light source 70 preferably approximates a broadband light source and may include a broadband light source (e.g., white light) or multiple different light sources that are powered together to simulate a broadband light source (e.g., multiple LEDs or laser diodes operating and different colors or wavelengths).

The lens-based modular attachment 68 may contain a slot 74, tray, receptacle or the like that can receive the sample holder 22 containing the sample 18 so as to place the sample 18 in an optical path formed between the light source 70 and the image sensor 64 of the mobile phone 60. As seen in FIG. 4A, a magnifying lens 75 or a set of lenses or lens module 75 is located in the lens-based modular attachment 68 on the opposing side (relative to the light source 70) of the sample holder 22. Note that the magnification lens 75 or set of lenses 75 need not provide high magnification. A 1× magnification (e.g., 100% increase in object's 19 size) may be sufficient although larger magnifications (e.g., greater than 2×) will reduce image and color artifacts. The image sensor 64 that is used in the mobile phone 60 is a color-based image sensor that is typically found in Smartphone devices (e.g., digital image sensor chips (CMOS or CCD)) that utilize color filter arrays (CFA).

In one embodiment, the lens-based modular attachment 68 may be secured to the housing of the mobile phone 60 using mechanical grips, tabs, clips 76 or the like (as seen in FIG. 4B) such that lens-based modular attachment 68 may be attached to the mobile phone 60 during imaging and removed after use. The lens-based modular attachment 68 may also contain or be associated with one or more batteries 77 that are used to power the light source 70. The light source 70 may, alternatively, be powered using the power of mobile phone 60 using a cable or connector (not shown) in some alternative embodiments. The lens-based modular attachment 68 may also have a translation stage 69 integrated therein so that the sample holder 22 can be scanned in the x and y directions so that multiple smaller FOV images can be acquired that can later be digitally tiled together to match the larger FOV of the image obtained from the holographic microscope 12. Knobs 78 located on the lens-based modular attachment 68 may be used to move the sample holder 22 in the x and y directions. Another knob 79 provided on the lens-based modular attachment 68 interfaces with the translation stage 69 to move the same in the z direction. This z adjustment is used to focus the color image.

In one embodiment, rather than have a benchtop or desktop holographic microscope device 12 such as that illustrated in FIG. 2A, the same functionality may be incorporated into a holographic based modular attachment 80 as seen in FIG. 4A. In one specific embodiment, this holographic based modular attachment 80 is lens-free. For example, the holographic modular attachment 80 may include a partially coherent light source 82 which may include a LED or laser diode, an aperture 83 or its equivalent for spatial filtering, and a slot 84, tray, receptacle or the like that can receive the sample holder 22 containing the sample 18 so as to place the sample 18 in an optical path formed between the partially coherent light source 82 and the image sensor 64. The holographic modular attachment 80 also includes a translation stage 86 which allows for movements in the x, y, and z directions to obtain a pixel super-resolution image as described herein. Knobs 87 may be used to move the sample holder 22 in the x and y directions while knob 88 may be used to move the sample holder 22 in the z direction. Images may be transferred to the computer 30 using a wired or wireless connection. For example, the mobile phone 60 may contain software or an application (i.e., "app") that is used to acquire the lower resolution lens-free images which can then be offloaded or transferred to the computer 30 for further processing. The holographic based modular attachment 80 may also include mechanical grips, tabs, clips 76 or the like to secure the same to the phone as seen in FIG. 4B.

In one particular embodiment, the same mobile phone 60 is used to obtain the color images 52 (using the lens-based modular attachment 68) and the mono-color images 42 used to generate the pixel super-resolution image 50 (using the holographic modular attachment 80). In this regard, the same image sensor 64 is used for obtaining the low-resolution color images 52 and the high resolution, reconstructed image 50. As seen in FIG. 1, the color calibrated (and possibly noise corrected) low resolution color image 52 is merged with the high resolution, reconstructed image 50 to generate wavelet-based fused images 54 as further explained below.

Figure 5A:
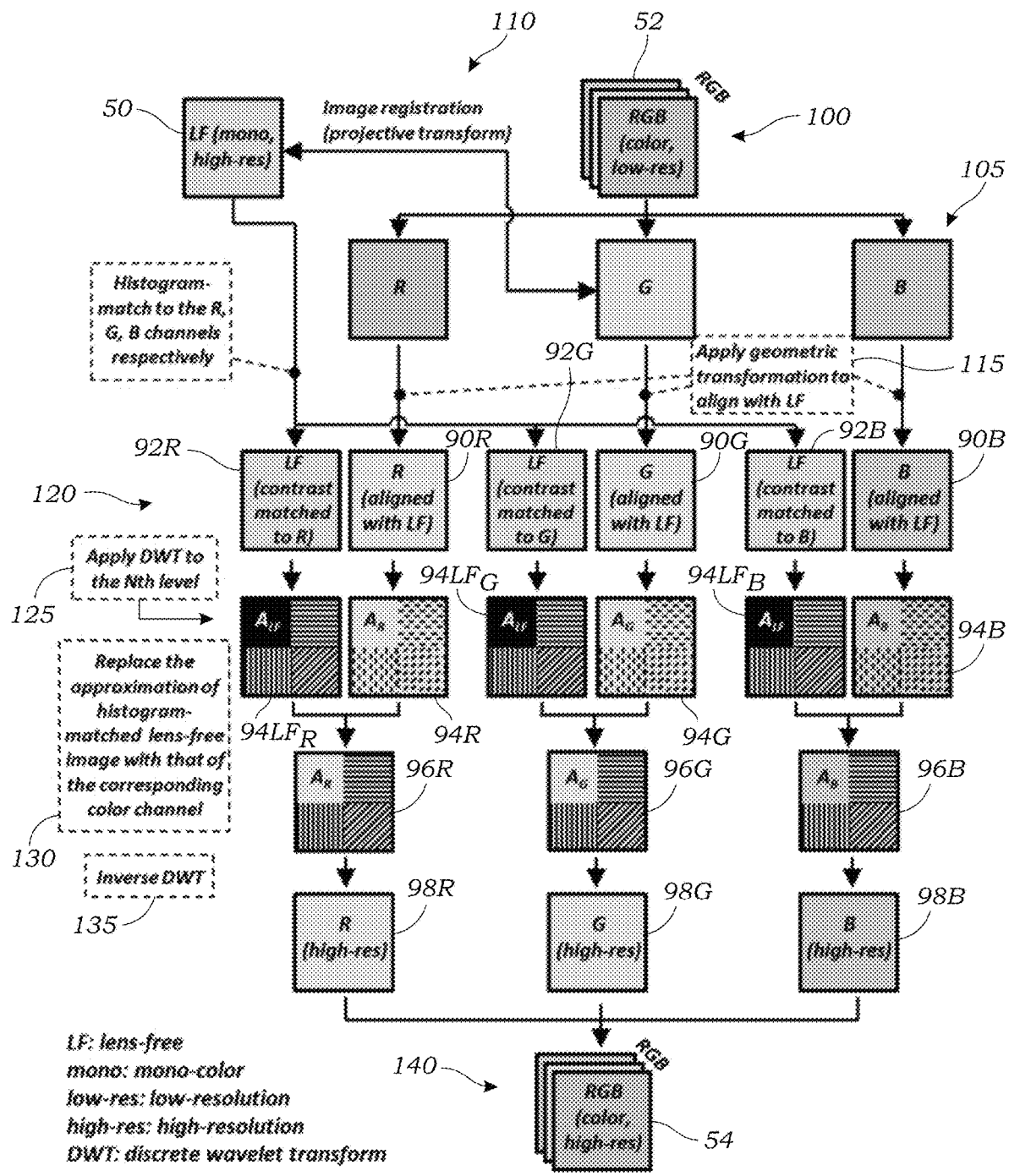
FIG. 5A illustrates a flow chart of the wavelet-based image fusion algorithm that is used to merge the low resolution components obtained from the low resolution color image obtained using the lens-based microscope and the high resolution components from the high resolution, mono-colored reconstructed image obtained using the lens-free microscope.

FIG. 5A illustrates a graphical representation of the operation of how selected features from both the low-resolution color image(s) 52 and the high-resolution, computationally reconstructed image 50 (e.g., pixel super-resolution image) are selected and then merged to create a color image that has both accurate color reproduction (e.g., high color fidelity) along with high resolution. The process starts at operation 100 with the high resolution, computationally reconstructed image 50 and the low resolution color image 52. The low resolution color image 52 in FIG. 5A is already color-calibrated as explained in more detail below. The effective pixel sizes of the holographic mono-color image 50 and the lens-based color image 52 are first matched through image resizing. Then, the red (R), green (G), and blue (B) channels of the RGB image are extracted as seen in operation 105. The green (G) channel is used to perform automated image registration (i.e., projective transformation) against the holographic image 50 as seen in operation 110. This may be performed using, for example, the automated feature matching implemented using the Computer Vision System Toolbox™ of MATLAB®. A geometric transformation matrix is calculated based on automatic matching of spatial features, and this transformation is applied to all the R, G and B channels as seen in operation 115, resulting in respective registered images 90R, 90G, 90B that are aligned with the holographic image.

After this image registration step, the contrast of the lens-free reconstructed mono-color image is matched as seen in operation 120 to the R, G and B channel images 90R, 90G, 90B respectively through a histogram matching operation to produce holographic or in this embodiment lens-free contrast matched images 92R, 92G, 92B for each of the R, G and B channels. As seen in FIG. 5A, a discrete wavelet transform (DWT) is next applied to each contrast-matched lens-free image 92R, 92G, 92B and the R, G, B channel color images 90R, 90G, 90B as seen in operation 125. In one particular embodiment, biorthogonal 3.7 basis DWT is used for wavelet decomposition. FIG. 5A illustrates a schematic representation of wavelet decomposed images 94LF$_R$, 94LF$_G$, 94LF$_B$, 94R, 94G, 94B of the contrast matched lens-free images 92R, 92G, 92B and the R, G, B channel color images 90R, 90G, 90B. The number of levels of the wavelet decomposition (N) mostly depends on the resolution gap between the mono-color holographic image 50 and the low-magnification, lens-based color image 52 but is typically between 4-6 levels.

Figure 5B:
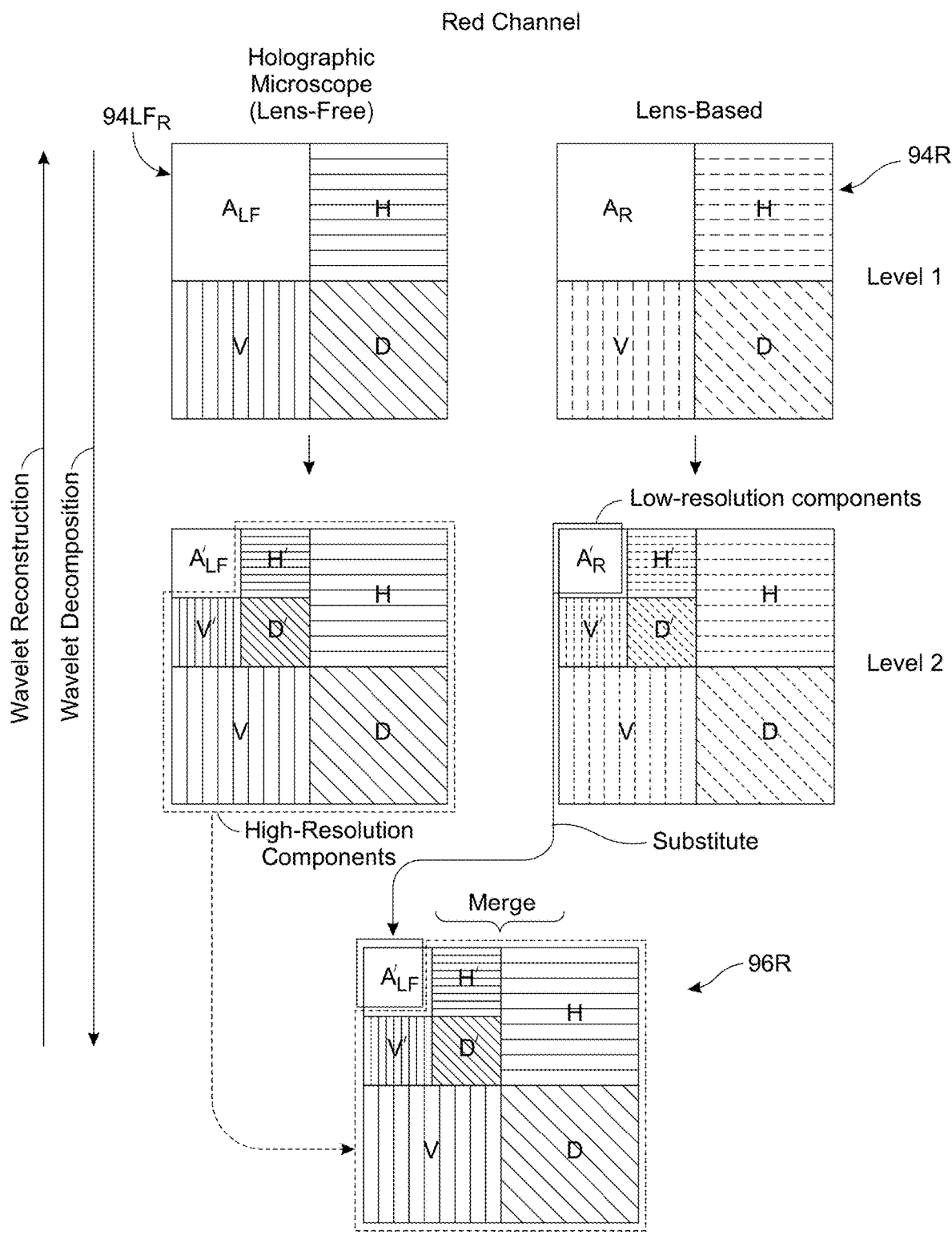
FIG. 5B schematically illustrates multiple (e.g., two) levels of DWT being performed on an image.

With reference to FIG. 5B, the DWT wavelet decomposition process takes the image (whether mono-color obtained from the holographic microscope or a single extracted color (R, G, B) obtained from the lens-based microscope) and, at the first level of decomposition, decomposes the image into an approximation ($A_{LF}$, $A_R$) which are represented by approximation wavelet coefficients as well a horizontal detail (H), vertical detail (V), and diagonal detail (D), which are represented by detail wavelet coefficients. In FIG. 5B, for illustration purposes, the DWT wavelet decomposition is illustrated only for the contrast-matched mono-color image and the extracted red channel (R) image. For the second level of decomposition, the approximations ($A_{LF}$, $A_R$) from the first level is further decomposed into approximations ($A'_{LF}$, $A'_R$) which are represented by approximation wavelet coefficients, as well a horizontal detail (H'), vertical detail (V'), and diagonal detail (D'), which are represented by detail wavelet coefficients. This process continues in the same manner for subsequent levels.

With reference back to FIG. 5A, after the desired number of levels have been decomposed, in the wavelet domain, for each channel (R, G and B), as seen in operation 130, a fused image 96R, 96G, 96B is generated by taking the low-resolution components (i.e., the approximation wavelet coefficients) for each color channel ($A_R$ from 94R, $A_G$ from 94G, $A_B$ from 94B) from the wavelet decomposed images 94R, 94G, 94B of the lens-based images and the high-resolution components (i.e., the detail wavelet coefficients) from the mono-color wavelet decomposed images 94LF$_R$, 94LF$_G$, 94LF$_B$ obtained from the holographic microscope, and merging them into a single image 96R, 96G, 96B for each color channel (R, G, B). As seen in FIG. 5B which illustrates the red channel for only two (2) levels, the merged image uses the high-resolution components (V, V', D, D', H, H' or detail wavelet coefficients) of the mono-color holographic image (i.e., lens-free image in this embodiment) and substitutes the low resolution components ($A'_R$ or approximation wavelet coefficients) from the lens-based color image to replace $A'_{LF}$.

Referring back to FIG. 5A, the fused images 96R, 96G, 96B of the R, G and B channels in the wavelet domain are then inverse wavelet transformed (i.e., wavelet reconstruction as seen in FIG. 5B) as seen in operation 135 (e.g., using biorthogonal 3.7 basis) to the spatial domain to create high resolution images 98R, 98G, 98B for each color channel. These high resolution images 98R, 98G, 98B are then combined into a composite RGB image 54 as seen in operation 140. Operations 100-140 may be performed using the image processing software 33 that is run on the computer 30. The final color images 54 that are generated have high color fidelity as well as high resolution.

Note that as seen in FIG. 5A, multiple low resolution color images 52 may be needed to in the merging operation. This is because the FOV of the low resolution color images 52 is small compared to the FOV of the holographic image 50. Thus, many smaller tiles of the low resolution color images 52 may be digitally stitched together to over the same FOV as the holographic image. Thus, the final color image 54 also has a high FOV in addition to the high color fidelity and high resolution.

Experimental

Experiments were conducted employing the merging algorithm described herein to demonstrate the ability of the microscopy system to achieve high color fidelity across a wide FOV by combining a holographic image of a sample acquired at a single wavelength with a color-calibrated and low resolution lens-based image using the wavelet-based image fusion. In these experiments, the holographic microscope 12 that was used was the lens-free benchtop 12 type illustrated in FIG. 2A.

Methods

Holographic (Lens-Free) On-Chip Imaging Setup

A broadband source (WhiteLase-Micro, Fianium Ltd, Southampton, UK) was filtered by an acousto-optic tunable filter to output partially coherent light within the visible spectrum with a bandwidth of ~2.5 nm and optical power of ~20 µW. The light is coupled into a single-mode optical fiber which illuminated a sample that is mounted on a 3D-printed slide holder that places the sample ~5-15 cm ($z_1$ distance) below the fiber tip. A CMOS image sensor chip (Sony, IMX081, 1.12 µm pixel size) was placed ~100-600 µm ($z_2$ distance) below the sample and is attached to a positioning stage (Thorlabs, NanoMax 606) for image sensor translation to perform pixel super-resolution and multi-height based phase recovery. A LabVIEW program coordinates different components of this setup during the image acquisition, and a desktop computer (Dell, Optiplex 9010) was used to process the image data.

Design and Assembly of the Mobile-Phone-Based Microscope

A custom-designed attachment module built with cost-effective opto-mechanical components and a 3D-printed housing (3D printer: Stratasys, Dimension Elite) was attached to a camera phone (Nokia Lumia 1020). Within the attachment, a white LED (MLEAWT-A1-R250-0004E5, Cree Inc.) powered by three AAA batteries is placed behind a diffuser to give uniform illumination on the sample that is mounted on a custom-fabricated x-y-z translation stage. The sample is placed in close proximity to an external lens (2.6 mm focal length), while the lens is placed right next to the camera module of the mobile phone when attached to the mobile phone. The focusing and sample translation can be both achieved by turning the knobs of the x-y-z translation stage.

Digital Fusion of a High-Resolution Lens-Free Mono-Color Image with a Low-Resolution Lens-Based Color Image Using a Wavelet Transform-Based Algorithm The effective pixel sizes of the lens-free mono-color image and the lens-based color image are first matched through image resizing. Then, as shown in FIG. 5A, the green channel of the RGB image is extracted to perform automated image registration against the lens-free image. Here, automated feature matching was implemented using the Computer Vision System Toolbox™ of MATLAB®. A geometric transformation matrix is calculated based on automatic matching of spatial features, and this transformation is applied to all the R, G and B components, resulting in a registered image that is aligned with the lens-free image. After this image registration step, the contrast of the lens-free reconstructed mono-color image is matched to the R, G and B channels respectively through histogram matching. Discrete wavelet transform (biorthogonal 3.7 basis) is next applied to each contrast-matched lens-free image and the R, G, B channels of the lens-based image. The number of levels of the wavelet decomposition (N) mostly depends on the resolution gap between the lens-free image and the low-magnification lens-based image. In the results described herein, the number of levels (N) was around ~4-6 levels. In the wavelet domain, for each channel (R, G and B) a fused image was created by taking the low-resolution components (approximation) from the lens-based image and the high-resolution components (detail) from the lens-free image, and merging them into a single image. The now fused images of the R, G and B channels in the wavelet domain are inverse wavelet transformed (biorthogonal 3.7 basis) to the spatial domain, and combined into a single RGB image.

Figure 6:
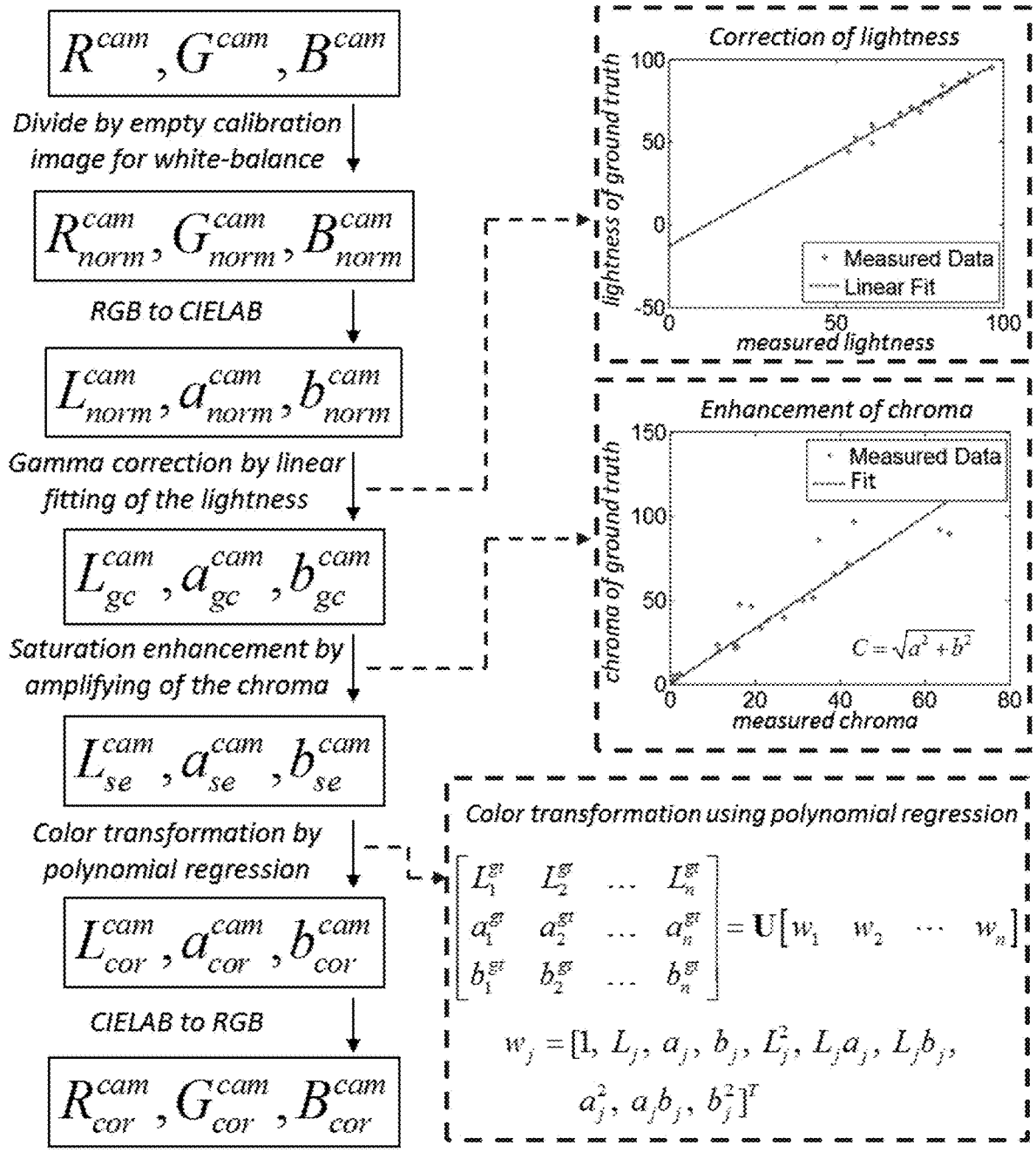
FIG. 6 illustrates a color calibration algorithm based on polynomial regression that is used in connection with the lens-based microscopes described herein to calibrate color. After this initial calibration, the color correction functions and transformations are digitally saved to be used to correct any captured image using the same calibrated imaging system.
Figures 7A, 7B, 7C, 7D, 7E:
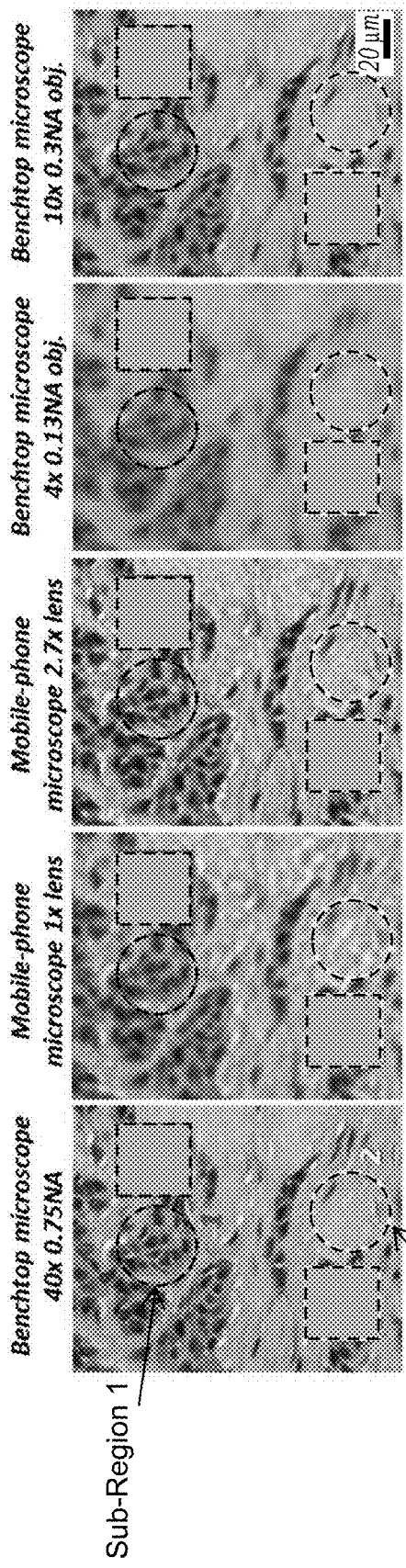
FIG. 7(a) illustrates an image of H&E stained breast cancer tissue sections. To compare the color reproduction results of the color-calibrated lens-based microscope images, two sub-regions were chosen to calculate the mean RGB values. Sub-region 1 mainly consists of cell nuclei, thus the average color of sub-region 1 is a purplish blue. Sub-region 2 mainly consists of stroma, thus the average color of sub-region 2 is pink. The square near sub-region 1 is the average color of sub-region 1 which is purplish blue. The square near sub-region 2 is the average color of sub-region 2 which is pink. This image was taken with a benchtop microscope with a 40×0.75 NA objective lens (used as reference). Sub-regions 1 and 2 and squares or patches are reproduced in each of FIGS. 7(b)-7(e).
FIG. 7(b) is an image of the same H&E stained breast cancer tissue section of FIG. 7(a) that was imaged with the mobile phone based microscope with a 1× lens.
FIG. 7(c) is an image of the same H&E stained breast cancer tissue section of FIG. 7(a) that was imaged with the mobile phone based microscope with a 2.7× lens.
FIG. 7(d) is an image of the same H&E stained breast cancer tissue section of FIG. 7(a) that was imaged with a benchtop microscope with a 4×0.13 NA objective lens.
FIG. 7(e) is an image of the same H&E stained breast cancer tissue section of FIG. 7(a) that was imaged with a benchtop microscope with a 10×0.3 NA objective lens.

Color Calibration of a Bright-Field Lens-Based Microscope Using Polynomial Regression This initial color calibration procedure needs to be conducted only once for each lens-based imaging system (i.e., for each lens/microscope combination) and it can be performed using a color checker whose actual colors (ground truth) are well known, e.g., through spectral measurements made with an optical spectrum analyzer or a wavelength scanning source. Here, lens-free hyperspectral imaging was used as an alternative method for color calibration. The purpose of this color calibration step is to find a mapping that corrects the colors captured by a digital microscope by re-mapping them to the actual colors defined by the ground truth. A color calibration procedure was used that is based on polynomial regression. This procedure, as outlined in FIG. 6, involves four steps: (1) image normalization and white balance, (2) correction of lightness, (3) correction of desaturation, and (4) color transformation, which will be detailed below.

(1) Image Normalization and White Balance:

The captured image of the sample is normalized by an empty calibration image taken without a sample to compensate for the responsivity differences of different color-pixels and the possible deviation of the illumination source from standard illuminant (i.e., the standard spectrum of daylight, D65). Note that if the experimental parameters such as the illumination power, exposure time, filters in the light path, white-balance options of the camera, etc. are repeatable each time, this calibration process needs to be done only once for each lens/camera combination. The RGB image after this normalization is converted into the CIELAB color space, where the L component represents the lightness, while a and b components represent the color or chroma. Note that the RGB color space used herein is the linear RGB color space.

(2) Correction of Lightness:

A fitting function is then calculated between the lightness (L) component of the output of (1) and the L component of the ground truth. Generally a polynomial function can be used to describe the fitting, but a linear fit is also sufficient when the camera response to light intensity is linear, without a gamma correction step.

(3) Correction of Desaturation:

The saturation of the captured image is enhanced to match that of the ground truth by appropriately scaling the chroma component $$c = \sqrt{a^2 + b^2}.$$

A scaling factor is calculated between the chroma of the output of (2) and the chroma of the ground truth in the least-square sense. This scaling factor is then used to modify a and b components of the output of (2).

(4) Color Transformation:

After steps (1)-(3), the color representation of the sample image gets closer to the actual colors, but there can still be additional sources of error, depending on the properties of the camera and the optical components. To mitigate these additional error sources, a transformation is calculated between the L, a, b components of the output of (3) and the L, a, b components of the ground truth colors. For this purpose, a polynomial regression to the $2^{nd}$ order is used and a color transformation matrix U is calculated. Let us assume that $v_j^{gt}=[L_j^{gt}\ a_j^{gt}\ b_j^{gt}]^T$ denotes the color coordinates of the ground truth color of the $j^{th}$ patch of the color checker (j=1, 2, . . . , m), m is the total number of patches, and that $w_j=[1, L_j, a_j, b_j, L_j^2, L_ja_j, L_jb_j, a_j^2, a_jb_j, b_j^2]^T$ contains the elements of the $2^{nd}$-order polynomial in $L_j$, $a_j$, and $b_j$ which represent the color coordinates of the same color patch captured by the camera. The color transformation matrix U can be calculated by solving the following equation, in the least-square sense:

$$V^{gt}=UW \qquad (1)$$

where $V^{gt}=[v_1^{gt}\ v_2^{gt}\ \ldots\ v_m^{gt}]$ and $W=[w_1\ w_2\ \ldots\ w_m]$.

The above detailed steps are conducted sequentially such that at the end of each step, the colors of the object image get closer to the ground truth. The color correction functions/transformations are digitally stored for each imaging system, and are used to calibrate the captured images using the same set of procedures.

Image Denoising and Digital Compensation for Optical Aberrations

The mobile-phone based microscope uses a cost-effective image sensor chip and low-cost LED lighting, and therefore the level of noise in its images is relatively high compared to a benchtop microscope. In addition, the inexpensive external lens module that is placed in front of the mobile-phone camera results in additional optical aberrations. To mitigate these limitations, image denoising and aberration correction were digitally performed to the images obtained through the mobile-phone microscope. For this purpose, the raw image from the mobile-phone microscope was converted into raw .tif format, which was then demosaiced, resulting in an RGB image. A region of interest was cropped out from this RGB image, and the R, G, B channels were aligned to each other using feature-matching-based image registration assuming a projective transform. Then a wavelet hard-threshold denoising algorithm is performed to each channel (R, G and B) of the color image. The resulting mobile-phone image is ready for subsequent color calibration and image fusion steps.

Fabrication of Transmission Color Checker Patterns

Custom fabricated two transmission-mode color checker patterns were used to calibrate the colors of the imaging systems. These two color checkers were composed of forty six patches in total, with each patch cut from one color filter from the Roscolux filter booklet. The second color checker with twenty four patches was an addition to the first checker to increase the number of samples in the color space. These filters were first cut into ~0.5-1 mm squares, and were arranged onto a glass microscope slide. Next, a drop of NOA61 (Norland Products, Cranbury, N.J.) was put on top of the filter patches, and a piece of glass cover slip was put on top for enclosure.

Ground Truth Color Calibration Using Hyper-Spectral Lens-Free Imaging

The ground truth of the color patches was determined using hyper-spectral lens-free imaging. The lens-free microscope was used to image the color checker at wavelengths from 400 nm to 700 nm with 10 nm intervals, which is sufficient as the color matching functions are relatively broadband curves. The spatial dimensions of all the color checkers can fit directly into the FOV of the lens-free microscope, thus there is no need for mechanical scanning, which is an advantage for using lens-free hyper-spectral imaging to create ground truth color calibration. For each wavelength, multi-height phase recovery using ten heights with 15 µm intervals was used. Pixel super-resolution was not implemented here due to the relatively large size of each color patch (~0.5-1 mm). The normalized hyper-spectral intensity reconstructions of the patches directly reflect the transmission of the patches at different wavelengths. After extracting these transmission spectra, there were correlated with the color matching functions of human perception (CIE standard observer) to get the XYZ color coordinates, from which, the RGB values can be calculated.

Holographic Image Reconstruction Using the Angular Spectrum Approach

Assuming that the phase information of an optical wavefront is recovered, which is detailed below, a complex hologram can be digitally back-propagated to the object plane to reveal its spatial structure using the angular spectrum approach. This is described, for example, in Greenbaum et al., Wide-field computational imaging of pathology slides using lens-free on-chip microscopy, Sci. Transl. Med. 6, pp. 267ra175 (2014) and Goodman J., Introduction to Fourier Optics, 3rd ed., Greenwood Village, Colo.: Roberts and Company Publishers (2004), which are incorporated herein by reference First, the hologram is Fourier transformed to the spatial frequency domain using a fast Fourier transform to obtain its angular spectrum. Then, the angular spectrum is multiplied by a phase factor, which is determined by the distance of object-to-sensor planes, wavelength and refractive index of the medium. The resulting digitally propagated spatial frequency spectrum is then inverse Fourier transformed to obtain the object's image. The object-to-sensor distance that is used in this angular spectrum approach can be estimated using an auto-focusing algorithm.

Multi-Height Based Iterative Phase Recovery

To retrieve the phase information of in-line holograms, a multi-height based iterative phase recovery approach was used. During the image acquisition, the object is translated along the z direction multiple times (usually 5-10) with increments of 10-20 µm. This multi-height hologram stack is used to recover the phase information using the following algorithm.

(1) Obtain an Initial Guess of the Lost Phase.

The solution of the transport of intensity equation (TIE) was used as the initial phase guess. TIE is in general a lower resolution deterministic phase recovery method, which is able to solve for the optical phase from multiple holograms (or diffraction patterns) acquired at different z positions. Here, two holograms from the multi-height hologram stack are utilized to perform the TIE based phase recovery.

(2) Iterative Phase Recovery.

By convention, the acquired holograms are sorted by their vertical distance in ascending order, i.e., the closest z corresponds to the first hologram. After an initial phase guess that is estimated using the TIE, the iterative phase recovery algorithm is started by constructing an initial guess of the complex optical wave at the first height, whose amplitude is the square root of the first measured hologram and whose phase is the initial phase guess from Step (1). This complex optical wave is then digitally propagated to the second height, where its amplitude is averaged with the square root of the second hologram, and the phase is kept. The same procedure is repeated to the third height, fourth height, etc. and then backwards, with the phase being refined at each step. After typically ~10-20 iterations the algorithm converges. Besides the phase, the amplitude of each hologram plane is also refined in this process, as the averaging operation reduces the noise occurring at each captured hologram.

(3) The Complex Wave Defined by the Converged Amplitude and Phase of a Given Hologram Plane/Height is Back-Propagated to the Object Plane.

This final step can be done for any one of the hologram planes. This provides a degree of depth resolution for the sample that is imaged.

Digital Tilt Correction Using Rotational Field Transformation

The multi-height based phase recovery process assumes that the object is parallel to the image sensor for all the measurement heights/planes. In practice, however, there usually exists some tilting angle between the object and the image sensor planes, which causes the reconstructions to be aberrated and defocused. A digital tilt correction algorithm was added to the multi-height based iterative phase recovery process to correct for this artifact. This rotational field transformation based approach provides a numerical method to calculate the complex optical wavefront on a tilted plane, given the knowledge of the wavefront on the original plane and the angle between the two planes. In the multi-height based iterative phase recovery routine, instead of directly averaging the amplitude guess with the measurement, the guess of the optical wavefront is first rotated to a plane that is parallel to the image sensor before the updating (i.e., averaging) of field amplitudes takes place. After the amplitude updating, the optical wave is then rotated back to the plane parallel to the object. This algorithm requires the knowledge of the tilting angle between the object and the image sensor planes. The tilting angle is calculated by autofocusing on different regions of the object inside the lens-free field-of-view to obtain the vertical distances at different locations, and a plane is fitted to these points to accurately measure the tilting angle of the object with respect to the sensor plane. Additional details regarding methods used to correct for tilting may be found in U.S. application Ser. No. 15/500,880, which is incorporated by reference herein.

Results

Color Calibration Results of Lens-Based Mobile and Benchtop Microscopes

The color imaging performance of the two lens-based microscopy devices used herein were first calibrated. This included the portable mobile-phone-based microscope built from a Nokia Lumia 1020 smart-phone and the benchtop Olympus BX51 microscope. For the benchtop microscope, the color calibration is mainly targeted for the microscope camera, as the rest of the microscope optics is manufactured to give accurate color reproduction with natural daylight illumination (color temperature 5500 K); the chromatic aberration is also well corrected. For the mobile-phone based microscope, however, the illumination, external and internal lens modules and the image sensor all contribute to the inaccuracy of its color reproduction, and therefore the whole imaging system was calibrated as a black box.

The custom-fabricated color checkers and the ground truth colors were measured using lens-free hyper-spectral imaging and were used to calibrate the mobile-phone microscope and the benchtop microscope following a four-step color calibration procedure as detailed herein. Before this calibration, the captured colors were evidently distorted compared to the ground truth. The color images taken by the mobile-phone microscope had large amounts of desaturation. This was due to the fact that the demosaiced raw image was used directly without saturation enhancement and white-balancing steps that a mobile-phone would normally do, to keep the original signal values and the linearity of pixels. After the digital calibration, for almost all the color patches, the upper-left corners merge with the rest, indicating agreement to the ground truth colors.

Table 1 further quantifies the performance of the color calibration process using the CIE-94 color distance (smaller color distance the better). After calibration, the mean color distances are reduced by a factor of ~6 for the mobile-phone based microscope and ~3 for the benchtop microscope.

TABLE 1

| Microscope/objective | CIE-94 color distance before color calibration | | | CIE-94 color distance after color calibration | | |
|---|---|---|---|---|---|---|
| | mean | max | min | mean | max | min |
| Mobile-phone microscope 1 × lens | 12.43 | 22.82 | 0.38 | 2.02 | 7.07 | 0.18 |
| Mobile-phone microscope 2.7 × lens | 13.58 | 26.35 | 0.46 | 2.36 | 6.99 | 0.60 |
| Benchtop microscope 4 × 0.13 NA obj. | 6.24 | 15.35 | 0.85 | 2.31 | 8.87 | 0.36 |
| Benchtop microscope 10 × 0.3 NA obj. | 6.65 | 16.03 | 0.79 | 2.43 | 9.07 | 0.42 |
| Benchtop microscope 40 × 0.75 NA obj. | 6.33 | 15.85 | 0.87 | 2.38 | 7.65 | 0.37 |

For the mobile-phone microscope, the mean CIE-94 color distances from the ground truth colors were >12 before calibration, and reduced to <2.5 after calibration. For the benchtop microscope, the mean CIE-94 color distances from the ground truth colors were >6 before calibration, and reduced to <2.5 after calibration.

The success of this color calibration process can also be demonstrated by imaging 4-μm thick formalin-fixed paraffin-embedded (FFPE) hematoxylin and eosin (H&E) stained breast cancer tissue sections as illustrated in FIGS. 7(a)-7(e). For these experiments, existing and anonymous specimens were used, where any subject related information cannot be retrieved. Because the tissue is stained with H&E, the image mainly consists of pink and purplish blue colors. The pink-color areas are mostly stroma, whereas the purplish blue colors are mostly cell nuclei. Color accuracy in clinical imaging of such samples is extremely important as color artifacts can be mistaken for other components of tissue and even abnormal signatures, leading to misdiagnosis. Through visual comparison of FIGS. 7(a)-7(e), despite the resolution and noise differences among different microscope and lens combinations, the overall color reproduction in each case was very close to the rest. To quantify the consistency among these different images, two circular sub-regions of 40 μm diameter were chosen to calculate the average colors and color distances. Sub-region 1 (dark dashed circle) is mainly made up of nuclei (purplish blue), and sub-region 2 (light dashed circle) is mainly made up of stroma (pink). The mean values of R, G and B for each sub-region were calculated to compute the color distances of each image against a reference, which was chosen as the color calibrated benchtop microscope with a 40×0.75 NA objective lens (leftmost image). These results are summarized in Table 2 below. Because all the CIE-94 color distances are below 1.5, the differences are barely visible, providing a very good color agreement across various imaging devices and configurations. This cross-validation also shows that the color calibration works very well with the colors of interest in an H&E-stained tissue sample. Even better color calibration outcome could in general be achieved by increasing the sampling in the color space, coupled with adopting other color calibration algorithms such as a look-up table (LUT) or a neural network.

tion lenses of a benchtop microscope as well as the lens-based mobile phone-based microscope, agree very well with the reference image, yielding almost indiscernible differences. Across different lens-free images that are fused with the mobile phone based microscope images, color fluctuation artifacts exist in the 1× magnification results (FIG. 8(c), dark arrows) showing some pinkish color patches that are not seen in the reference image (FIG. 8(a)). This artifact arises due to the fact that the 1× mobile-phone microscope has relatively low resolution, thus a deeper wavelet-decomposition level (N=6) was used, which couples some of the low-resolution modulation of the lens-free image into the final color representation. On the other hand, FIG. 8(d) is free of such artifacts due to the higher resolution of the 2.7×

TABLE 2

| Microscope/objective | Sub-region 1 (nucleus) | | Sub-region 2 (stroma) | |
|---|---|---|---|---|
| | Region mean R, G, B | Color distance from benchtop 40× | Region mean R, G, B | Color distance from benchtop 40× |
| Benchtop microscope 40× 0.75 NA obj. | 0.58, 0.50, 0.86 | 0 | 0.82, 0.71, 0.96 | 0 |
| Mobile-phone microscope 1× lens | 0.58, 0.48, 0.86 | 1.21 | 0.82, 0.72, 0.93 | 1.36 |
| Mobile-phone microscope 2.7× lens | 0.56, 0.50, 0.87 | 0.93 | 0.80, 0.72, 0.93 | 1.46 |
| Benchtop microscope 4× 0.13 NA obj. | 0.55, 0.49, 0.87 | 1.27 | 0.78, 0.70, 0.96 | 1.24 |
| Benchtop microscope 10× 0.3 NA obj. | 0.56, 0.49, 0.87 | 0.79 | 0.81, 0.71, 0.96 | 0.42 |

Calibrated average colors of sub-regions 1 and 2 shown in FIGS. 7(a)-7(e) imaged by different devices. As shown in this table, all the color distances are below 1.5, verifying the effectiveness of the presented color calibration method.

Color Imaging of Tissue Sections Using Lens-Free and Lens-Based Image Fusion

After demonstrating that the color-calibrated lens-based microscopes generate accurate color reproduction that is consistent across devices and imaging configurations, the following demonstrates the capabilities of the lens-free and lens-based image fusion technique for achieving high resolution and accurate color reproduction over a wide FOV using breast cancer tissue sections. For this aim, color imaging results are compared between lens-free microscopy that is fused with various low-magnification lens-based microscope combinations (i.e., mobile-phone 1×, mobile-phone 2.7×, benchtop 4×, benchtop 10×) against some of the previously used colorization techniques including: (1) lens-free RGB combination based colorization, (2) lens-free YUV color space averaging based colorization, and (3) a color-calibrated benchtop microscope with a 40×0.75 NA objective lens which is used as the reference. FIG. 8(a) shows the same region of interest as in FIGS. 7(a)-7(e) captured by the color-calibrated benchtop microscope with a 40×0.75 NA objective lens; FIG. 8(b) shows the lens-free single-wavelength (mono-color) intensity reconstruction image that is used as an input to the image fusion approach. FIGS. 8(c) through 8(f) show the results of the image fusion method used with different microscope-lens combinations (i.e., mobile phone with 1× lens; mobile phone with 2.7× lens; benchtop 4×, 0.13 NA objective; benchtop 10×, 0.3 NA objective). The color reproduction of the lens-free and lens-based image fusion technique, using lower magnification lenses of a benchtop microscope as well as the lens-based mobile phone-based microscope, agree very well with magnification geometry of the mobile-phone microscope and the shallower wavelet-decomposition level (N=5) that was used.

In the fusion result using the benchtop microscope with a 4×0.13 NA objective lens (FIG. 8(e)), the image shows that the purplish blue color of the nuclei partially diffuses into the surrounding tissue, as a result of the low resolution of the 4× objective lens. In comparison, the same color diffusion effect/artifact is not found in the image fusion results using the benchtop microscope image taken with a 10×0.3 NA objective lens for the same reasons detailed above (FIG. 8(f)). To expand this comparison, FIG. 8(g) shows the colorization result of a different RGB-combination method which utilized holographic reconstructions at three wavelengths (B: 471 nm, G: 532 nm, R: 633 nm) using purely the lens-free on-chip microscope. In this case, the stroma is more reddish in color than the reference image; and the nuclei appear more purplish. More importantly, at certain locations (labeled by the light arrows in FIG. 8(g)) color artifacts are relatively strong, showing reddish and yellowish colors. As yet another comparison, FIG. 8(h) shows the result obtained using the lens-free YUV color space averaging method using illumination wavelengths of 471 nm, 532 nm and 633 nm. As spatial blurring is done to the chroma components in this technique, the color is not only distorted similar to FIG. 8(d), but also partially blurred.

To better quantify and summarize the above described results and image comparisons across different devices and colorization techniques, the color distances were calculated from the reference image in Table 3 below.

TABLE 3

| Imaging and colorization technique | Entire image | | Sub-region 1 (nucleus) | | Sub-region 2 (stroma) | |
|---|---|---|---|---|---|---|
| | Pixel-by-pixel | Region average | Pixel-by-pixel | Region average | Pixel-by-pixel | Region average |
| Fusion with mobile-phone microscope, 1× | 3.31 | 0.52 | 3.36 | 0.97 | 2.83 | 1.12 |
| Fusion with mobile-phone microscope, 2.7× | 3.26 | 0.42 | 3.26 | 0.86 | 2.69 | 0.73 |
| Fusion with benchtop microscope, 4 × 0.13 NA | 3.51 | 1.13 | 4.18 | 1.27 | 2.69 | 1.24 |
| Fusion with benchtop microscope, 10 × 0.3 NA | 3.03 | 0.46 | 3.34 | 0.79 | 2.47 | 0.42 |
| Lens-free RGB combination | 5.92 | 2.81 | 6.31 | 2.50 | 5.09 | 3.15 |
| Lens-free YUV color space averaging | 8.76 | 3.64 | 10.44 | 2.65 | 6.86 | 5.44 |

Quantification of Color Distances.

Two different CIE-94 mean color distance measures were calculated. First, "pixel-by-pixel" values were calculate using the CIE-94 color distance from the reference 40× color-calibrated benchtop microscope image for each individual pixel and averaged. Second, "region average" values were calculated with R, G, and B values of the region of interest being averaged, and the CIE-94 color distance of the averaged RGB was determined from the reference image (also RGB-averaged in the corresponding region). The image fusion results show significant improvements in reduction of color distances.

Sub-regions 1 and 2 were the same regions of interest as defined in FIGS. 7(a)-7(e). Furthermore, another color-distance measure was added; defined as the mean CIE-94 color distance on a pixel-by-pixel comparison basis. This new measure is expected to be larger than the color distance of the region-average RGB, as the differences in resolution and spatial details are also included in its calculation. For all the image fusion results, the pixel-by-pixel mean color distances from the reference image mostly fall below 3.5 (see Table 3 above) and are on a similar level, except for the fusion with the benchtop microscope image with a 4×0.13 NA objective lens that has a larger color error for sub-region 1. This, again, can be explained by the diffusion of the local image colors into their vicinity as a result of the low resolution of the 4× image used for fusion, and this causes the details of FIG. 8(e) to deviate from the reference image. Interestingly, the pixel-by-pixel average color error values of the fusion results using the mobile-phone microscope are very close to each other. Meanwhile, the pixel-by-pixel mean color distances of the lens-free RGB combination and lens-free YUV color space averaging techniques are almost twice larger than the image fusion results, implying worse color reproduction.

As stated previously, besides benefiting from accurate color reproduction of lens-based color imaging devices, the presented image fusion method also benefits from lens-free microscopy by achieving high resolution across a large FOV. FIGS. 9(a)-9(l) illustrate zoomed-in or magnified, smaller regions of the tissue sample that were evaluated and compared for their ability to preserve the sharp features at cell boundaries, where a one-dimensional line L profile is provided across two nuclei separated by a narrow gap in each image.

In FIG. 9(a), the reference image that is captured by a color calibrated benchtop microscope using a 40×0.75 NA objective lens is illustrated. FIG. 9(b) shows an image of the same region of sample using of the lens-free intensity image shown in grayscale. For all the other panels (9(c)-9(l)), below each image, the solid curves corresponding to the R, G and B channels, respectively) show the line profiles of the current image, and the dashed curves show the line profiles of the reference image of FIG. 9(a), presented for comparison. As shown in FIGS. 9(d), 9(f), 9(j), 9(l), the images acquired using the low-magnification benchtop microscope and the mobile-phone microscope are low-resolution, with the spatial features (e.g., the line profile dips between the nuclei) either completely lost (FIG. 9(d), 9(j)) or significantly reduced in contrast (FIG. 9(f), 9(l)). The image fusion based colorization method (FIG. 9(c), 9(e), 9(i), 9(k)), on the other hand, clearly shows the spatial features of the nuclei, and the line profiles agree very well with the reference image (FIG. 9(a)). The line profiles of the lens-free RGB combination and lens-free YUV color space averaging methods exhibit similar spatial resolution as the lens-free grayscale image, but the curves deviate from the reference image due to inaccurate color representation, further emphasizing the advantages of the presented image fusion based colorization approach.

The results contained herein demonstrate that the image fusion based colorization method can achieve high resolution and color fidelity simultaneously. However, another important advantage lies in the large FOV that can be achieved. Lens-free on-chip microscopy has a FOV that is equivalent to the active area of the imager chip, which is ~20.5 mm$^2$ in the experiments that are reported herein. Nevertheless, this is not the case with lens-based imaging systems; for example a 40× objective lens typically has a FOV of ~0.1 mm$^2$. In this image fusion based colorization method, to better make use of the large FOV provided by lens-free on-chip microscopy, low-magnification and low-NA lens-based microscopes were used to provide color-calibrated large FOV images to be merged with the reconstructed high-resolution lens-free images. To further expand on this, Table 4 below summarizes the imaging FOVs of different microscope-lens combinations that were used in this work.

TABLE 4

| Microscope/objective | Effective pixel size (μm) | FOV (mm$^2$) | # of tiles to match the lens-free FOV |
|---|---|---|---|
| Lens-free microscope | 0.37 | 20.5 | 1 |
| Mobile-phone microscope, 1× | 1.14 | 3.9 | >5 |

TABLE 4-continued

| Microscope/objective | Effective pixel size (µm) | FOV (mm²) | # of tiles to match the lens-free FOV |
|---|---|---|---|
| Mobile-phone microscope, 2.7× | 0.46 | 2.1 | ~10 |
| Benchtop microscope 4× 0.13 NA obj. | 1.52 | 11.6 | ~2 |
| Benchtop microscope 10× 0.3 NA obj. | 0.60 | 1.8 | >11 |
| Benchtop microscope 40× 0.75 NA obj. | 0.15 | 0.1 | >200 |

For example, the mobile-phone microscope with a 1× magnification system has a FOV of 3.9 mm². To match the FOV of the lens-free microscope used in this work, one needs to stitch >5 images together. For the benchtop microscope, on the other hand, one needs to stitch approximately two images for the 4× objective lens and >11 images for the 10× objective lens. Capturing the images of these different FOVs can be achieved by e.g., manually scanning the sample (e.g., turning knobs 78 or using a mechanical stage), and the digital stitching of different images can be automated through image registration.

In addition, the method described herein produces color images with a large depth-of-field (DOF). It is widely known that holographic imaging has an extended DOF compared to traditional incoherent light microscopy thanks to the knowledge of the complex optical wave. By digitally propagating the object wave to different planes, the features at different depths can be brought into focus. This is an important capability especially for imaging samples that have 3D morphology over the sample FOV. An important question is whether this freedom of 3D digital focusing could still be useful if the lens-free image were to be fused with a lens-based incoherent microscope image. Fortunately, because a low-magnification and low-NA lens-based imaging system is used, the DOF of the lens-based image is also quite large. Assuming an average wavelength of 550 nm in air, a 4×0.13 NA microscope objective has a DOF of ~32 µm. As another example, the mobile-phone microscope with 2.7× magnification has an NA of approximately 0.25, with a DOF of ~9 µm. Because of this, color images that are fused using the methods described herein can be digitally focused over a relatively large depth range over the sample volume by simply refocusing the lens-free image before the image fusion step.

It should be noted that one limitation of the presented dual fusion method is that the resolution of its color (chroma) component is actually inferior to the resolution of its brightness component, as the source of the color information is a low-NA lens-based microscope. The success of this strategy relies on the widely accepted assumption that in most scenarios, the chroma (color) does not vary as fast as the brightness. This assumption is also used in high-quality de-bayering of raw color images. For example, in pathology the most important spatial details are usually at the cell boundaries or sub-cellular textures which are mostly brightness variations, thus the lower resolution of the color component would be acceptable.

Another issue that is worth discussing is the optical aberrations across the entire imaging FOV, which is especially significant for mobile phone-based microscope images. The external lenses used in the mobile-phone microscopes used herein are in general low-cost compound lens modules, also taken from mobile-phone cameras in many cases, which are not optimized for microscopy purposes. As a result, the image is not as sharp at the edges of the FOV as it is at the center, the focal distances for R, G, and B channels are slightly different, and in addition to these, there exists a dislocation among the R, G, and B channels. Besides using higher-quality lenses, alternative approaches to mitigate aberrations include capturing more images that focus on R, G and B channels individually and use only the center of the FOV where the image is the sharpest. These approaches will either relatively raise the cost of the system or increase the image acquisition time, which might not be acceptable in certain applications. Here, digital correction was performed for the displacement among the R, G, B channels using an image registration algorithm and neglected the other sources of aberrations. Although these remaining aberrations due to poor optical components/lenses inevitably affect the results, their impact on spatial resolution is not as critical since the image fusion approach does not rely on the lens-based image for resolution.

This microscopy technique can achieve high color fidelity and high resolution across a wide FOV by combining a holographic image acquired at a single wavelength with a color-calibrated and low-resolution lens-based image using a wavelet-based image fusion algorithm. This method combines the wide FOV and high resolution advantages of lens-free holographic microscopy with accurate color reproduction of a color-calibrated lens-based bright-field microscope, generating images that match the chromatic perception of human vision. Using this method tissue samples were successfully imaged and demonstrated that by combining a lens-free microscope with a low-cost mobile-phone-based microscope, accurate color images of specimen can be obtained, coming very close to the images of a high-NA and color-calibrated benchtop microscope. This method might present a promising solution for telepathology applications in resource limited environments, where digital whole-slide scanners are not available.

As explained herein, in one embodiment, a method of generating color images of a sample using mono-color holographic images of the sample obtained from a lens-free microscope and one or more color images of the same sample using a lens-based microscope. In the method, a plurality of low resolution mono-color holographic images of the sample are obtained using the lens-free microscope at different spatial locations. A reconstructed high resolution mono-color holographic image of the sample is generated using the plurality of low resolution mono-color holographic images (e.g., using pixel super-resolution). One or more low resolution color (RGB) images of the sample are obtained with the lens-based microscope (e.g., using a benchtop device or portable electronic device). A red (R) channel, a green (G) channel, and a blue (B) channel are extracted from the one or more low resolution color images of the sample to generate a R channel extracted image, a G channel extracted image, and a B channel extracted image. The R channel extracted image, the G channel extracted image, and the B channel extracted image are registered with the high resolution mono-color holographic image based on spatial features contained in the high resolution mono-color holographic image. The contrast of the high resolution mono-color holographic image is matched to the R channel extracted image, the G channel extracted image, and the B channel extracted image.

A discrete wavelet transform (DWT) is applied to the contrast matched high resolution mono-color holographic image and the R channel extracted image, the G channel extracted image, and the B channel extracted image to decompose the images using wavelet decomposition. Next, respective red, green, and blue fused images are formed using the low resolution components (or approximate wavelet coefficients) from the R channel extracted image, the G channel extracted image, and the B channel extracted image and high resolution components (or detailed wavelet coefficients) from the high resolution mono-color holographic image. An inverse wavelet transform is applied the respective red, green, and blue fused images to generate a high resolution red image, a high resolution green image, and a high resolution blue. A composite RGB color image can then be generated from the high resolution red image, the high resolution green image, and the high resolution blue image.

As explained herein, in another embodiment, a system for generating color images of a sample using mono-color holographic images of the sample obtained from a lens-free microscope and one or more color images of the same sample using a lens-based microscope. The system includes a computing device configured to receive the mono-color holographic images of the sample obtained from a lens-free microscope and the one or more color images of the same sample using a lens-based microscope, the computing device containing one or more processors configured to execute imaging software thereon. The imaging software is configured to receive a plurality of low resolution mono-color holographic images of the sample using the lens-free microscope at different spatial locations; generate a reconstructed high resolution mono-color holographic image of the sample using the plurality of low resolution mono-color holographic images; receive one or more low resolution color images of the sample with the lens-based microscope; extract a red (R) channel, a green (G) channel, and a blue (B) channel from the one or more low resolution color images of the sample and generating a R channel extracted image, a G channel extracted image, and a B channel extracted image; register the R channel extracted image, the G channel extracted image, and the B channel extracted image with the high resolution mono-color holographic image based on spatial features contained in the high resolution mono-color holographic image; match the contrast of the high resolution mono-color holographic image to the R channel extracted image, the G channel extracted image, and the B channel extracted image; apply a discrete wavelet transform (DWT) to the contrast matched high resolution mono-color holographic image and the R channel extracted image, the G channel extracted image, and the B channel extracted image; generate respective red, green, and blue fused images using low resolution components from the R channel extracted image, the G channel extracted image, and the B channel extracted image and high resolution components from the high resolution mono-color holographic image; apply an inverse wavelet transform onto the respective red, green, and blue fused images to generate a high resolution red, a high resolution green image, and a high resolution blue image; and generate a composite RGB color image from the high resolution red image, the high resolution green image, and the high resolution blue image.

In yet another embodiment, a system for generating color images of a sample includes a lens-free microscope having a partially coherent light source configured to illuminate the sample and cast mono-color holograms that are captured by an image sensor disposed adjacent to the sample, wherein the lens-free microscope comprises an x, y adjuster for imparting relative movement in a plane substantially parallel to an active surface of the image sensor in the x direction and y direction and a z adjuster for imparting relative movement in a z direction that is substantially perpendicular to a plane of the active surface of the image sensor; a lens-based microscope having a broadband light source configured to illuminate the sample and at least one lens or lens set disposed along an optical path and an image sensor configured to capture color images of the sample; and one or more processors configured to execute imaging processing software thereon. The image processing software extracting red (R), green (G), and blue (B) images from the captured colored images and registering the extracted red (R), green (G), and blue (B) images with a reconstructed high resolution mono-color holographic image of the sample generated by a plurality of low resolution mono-color holographic images, imaging software further applying discrete wavelet transformation to the registered high resolution mono-color holographic image and the extracted red (R) image, the extracted green (G) image, and the extracted blue (B) image and generating respective red, green, and blue fused images using low resolution components from the extracted red (R) image, the extracted green (G) image, and the extracted blue (B) image and high resolution components from the high resolution mono-color holographic image; applying an inverse wavelet transform onto the respective red, green, and blue fused images to generate a high resolution red image, a high resolution green image, and a high resolution blue image; and generate a composite RGB color image from the high resolution red image, the high resolution green image, and the high resolution blue image.

While embodiments of the present invention have been shown and described, various modifications may be made without departing from the scope of the present invention. For example, the methods described herein are broadly applicable to all types of holographic microscopes including the specific embodiment of the lens-free holographic microscopes described herein. Thus, holographic microscopes encompasses, in some embodiments, both lens-free and other types of holographic microscopes. The invention, therefore, should not be limited, except to the following claims, and their equivalents.

What is claimed is:

1. A method of generating color images of a sample using mono-color holographic images of the sample obtained from a holographic microscope and one or more color images of the same sample using a lens-based microscope comprising:

obtaining a plurality of low resolution mono-color holographic images of the sample using the holographic microscope at different spatial locations;

generating a reconstructed high resolution mono-color holographic image of the sample using the plurality of low resolution mono-color holographic images;

obtaining one or more low resolution color images of the sample with the lens-based microscope;

extracting a red (R) channel, a green (G) channel, and a blue (B) channel from the one or more low resolution color images of the sample to generate an R channel extracted image, a G channel extracted image, and a B channel extracted image;

registering the R channel extracted image, the G channel extracted image, and the B channel extracted image with the high resolution mono-color holographic image based on spatial features contained in the high resolution holographic mono-color image;

matching the contrast of the high resolution mono-color holographic image to the R channel extracted image, the G channel extracted image, and the B channel extracted image;

applying discrete wavelet transform (DWT) to the contrast matched high resolution mono-color holographic image and the R channel extracted image, the G channel extracted image, and the B channel extracted image;

generating respective red, green, and blue fused images using low resolution components from the R channel extracted image, the G channel extracted image, and the B channel extracted image and high resolution components from the high resolution mono-color holographic image;

applying an inverse wavelet transform onto the respective red, green, and blue fused images to generate a high resolution red image, a high resolution green image, and a high resolution blue; and generating a composite RGB color image from the high resolution red image, the high resolution green image, and the high resolution blue image.

2. The method of claim 1, wherein the operations of: generating the reconstructed high resolution mono-color holographic image of the sample using the plurality of low resolution mono-color holographic images; extracting the red (R) channel, the green (G) channel, and the blue (B) channel from the one or more low resolution color images of the sample and using the extracted channels to create the R channel extracted image, the G channel extracted image, and the B channel extracted image; registering the R channel extracted image, the G channel extracted image, and the B channel extracted image with the high resolution mono-color holographic image based on spatial features contained in the high resolution mono-color holographic image; matching the contrast of the high resolution mono-color holographic image to the R channel extracted image, the G channel extracted image, and the B channel extracted image; applying discrete wavelet transform to the contrast matched high resolution mono-color holographic image and the R channel extracted image, the G channel extracted image, and the B channel extracted image; generating respective red, green, and blue fused images using low resolution components from the R channel extracted image, the G channel extracted image, and the B channel extracted image and high resolution components from the high resolution mono-color holographic image; applying an inverse wavelet transform onto the respective red, green, and blue fused images to generate the high resolution red image, the high resolution green image, and the high resolution blue image; and generating the composite RGB color image from the high resolution red image, the high resolution green image, and the high resolution blue image are performed by one or more processors configured to execute imaging processing software.

3. The method of claim 2, wherein a plurality of low resolution color images of the sample are obtained with the lens-based microscope and digitally stitched together for form a larger field-of-view (FOV) using the one or more processors.

4. The method of claim 2, wherein the one or more low resolution color images of the sample obtained by the lens-based microscope are subject to color calibration by the one or more processors.

5. The method of claim 2, wherein the one or more low resolution color images of the sample obtained by the lens-based microscope are subject to image denoising and aberration correction by the one or more processors.

6. The method of claim 2, wherein a plurality of levels of discrete wavelet transform (DWT) is applied to the contrast matched high resolution mono-color holographic images and the R channel extracted image, the G channel extracted image, and the B channel extracted image.

7. The method of claim 1, wherein the lens-based microscope comprises a portable electronic device having a holographic microscope attachment configured to be attached or secured to the portable electronic device.

8. The method of claim 7, wherein lens-based microscope comprises a lens-containing or set of lens-containing attachment configured to be attached or secured to the portable electronic device.

9. The method of claim 7, wherein the portable electronic device comprises one of a mobile phone, tablet computer, or webcam.

10. The method of claim 1, wherein the lens-based microscope comprises a benchtop microscope.

11. The method of claim 1, wherein the plurality of low resolution mono-color holographic images are obtained at a plurality of different $z_2$ distances by adjusting the relative distance between the sample and an image sensor located in the holographic microscope.

12. The method of claim 11, wherein the reconstructed high resolution mono-color holographic image of the sample is obtained by retrieving phase information for the plurality of low resolution mono-color holographic images using an iterative phase recovery process and back-propagating the retrieved complex wave to an object plane using one or more processors configured to execute imaging processing software.

13. The method of claim 12, further comprising applying a tilt correction to compensate for tilt between the sample and an image sensor plane in the holographic microscope.

14. The method of claim 11, wherein the plurality of low resolution mono-color holographic images of the sample are obtained by relative x, y directional shifts created between a generated hologram cast by the sample onto the image sensor located in in the holographic microscope.

15. The method of claim 14, wherein the relative directional shift is created by moving at least one of the sample, a light source contained in the holographic microscope, or the image sensor.

16. The method of claim 1, wherein the holographic microscope comprises a lens-free microscope.

17. A system for generating color images of a sample using mono-color holographic images of the sample obtained from a holographic microscope and one or more color images of the same sample using a lens-based microscope, the system comprising:

a computing device configured to receive the mono-color holographic images of the sample obtained from the holographic microscope and the one or more color images of the same sample using a lens-based microscope, the computing device containing one or more processors configured to execute imaging software thereon, the imaging software configured to:

receive a plurality of low resolution mono-color holographic images of the sample using the holographic microscope at different spatial locations;

generate a reconstructed high resolution mono-color holographic image of the sample using the plurality of low resolution mono-color holographic images;

receive one or more low resolution color images of the sample with the lens-based microscope;

extract a red (R) channel, a green (G) channel, and a blue (B) channel from the one or more low resolution color images of the sample and generating a R channel extracted image, a G channel extracted image, and a B channel extracted image;

register the R channel extracted image, the G channel extracted image, and the B channel extracted image with the high resolution mono-color holographic image based on spatial features contained in the high resolution mono-color holographic image;
match the contrast of the high resolution mono-color holographic image to the R channel extracted image, the G channel extracted image, and the B channel extracted image;
apply discrete wavelet transform (DWT) to the contrast matched high resolution mono-color holographic image and the R channel extracted image, the G channel extracted image, and the B channel extracted image;
generate respective red, green, and blue fused images using low resolution components from the R channel extracted image, the G channel extracted image, and the B channel extracted image and high resolution components from the high resolution mono-color holographic image;
apply an inverse wavelet transform onto the respective red, green, and blue fused images to generate a high resolution red, a high resolution green image, and a high resolution blue image; and
generate a composite RGB color image from the high resolution red image, the high resolution green image, and the high resolution blue image.

18. The system of claim 17, wherein the holographic microscope and the lens-based microscope share a common image sensor used to capture the mono-color holographic images of the sample and the one or more color images of the sample.

19. The system of claim 17, wherein the holographic microscope comprises a lens-free microscope.

20. A system for generating color images of a sample comprising:
a holographic microscope having a partially coherent light source configured to illuminate the sample and cast mono-color holograms that are captured by an image sensor disposed adjacent to the sample, wherein the holographic microscope comprises an x, y adjuster for imparting relative movement in a plane substantially parallel to an active surface of the image sensor in the x direction and y direction and a z adjuster for imparting relative movement in a z direction that is substantially perpendicular to a plane of the active surface of the image sensor;
a lens-based microscope having a broadband light source configured to illuminate the sample and at least one lens or lens set disposed along an optical path and an image sensor configured to capture color images of the sample; and
one or more processors configured to execute imaging processing software thereon, the image processing software extracting red (R), green (G), and blue (B) images from the captured colored images and registering the extracted red (R), green (G), and blue (B) images with a reconstructed high resolution mono-color holographic image of the sample generated by a plurality of low resolution mono-color holographic images, imaging software further applying discrete wavelet transformation to the registered high resolution mono-color holographic image and the extracted red (R) image, the extracted green (G) image, and the extracted blue (B) image and generating respective red, green, and blue fused images using low resolution components from the extracted red (R) image, the extracted green (G) image, and the extracted blue (B) image and high resolution components from the high resolution mono-color holographic image, applying an inverse wavelet transform onto the respective red, green, and blue fused images to generate a high resolution red image, a high resolution green image, and a high resolution blue image, and generate a composite RGB color image from the high resolution red image, the high resolution green image, and the high resolution blue image.

21. The system of claim 20, wherein the image sensor of the holographic microscope and the image sensor of the lens-based microscope comprise the same image sensor.

22. The system of claim 21, wherein the image sensor is contained in a portable electronic device.

23. The system of claim 22, wherein the holographic microscope comprises a first attachment that is configured to attach or secure to the portable electronic device and the lens-based microscope comprises a second attachment that is configured to attach or secure to the portable electronic device.

24. The system of claim 20, wherein the holographic microscope comprises a lens-free microscope.

* * * * *